US011950228B2

(12) United States Patent
Yokomakura et al.

(10) Patent No.: US 11,950,228 B2
(45) Date of Patent: Apr. 2, 2024

(54) TERMINAL APPARATUS, COMMUNICATION METHOD, AND INTEGRATED CIRCUIT

(71) Applicant: SHARP KABUSHIKI KAISHA, Sakai (JP)

(72) Inventors: Kazunari Yokomakura, Sakai (JP); Shohei Yamada, Sakai (JP); Hidekazu Tsuboi, Sakai (JP); Tatsushi Aiba, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/320,724

(22) PCT Filed: Jul. 11, 2017

(86) PCT No.: PCT/JP2017/025293
§ 371 (c)(1),
(2) Date: Jan. 25, 2019

(87) PCT Pub. No.: WO2018/021018
PCT Pub. Date: Feb. 1, 2018

(65) Prior Publication Data
US 2019/0166612 A1 May 30, 2019

(30) Foreign Application Priority Data

Jul. 29, 2016 (JP) ................................. 2016-149692

(51) Int. Cl.
H04W 72/1273 (2023.01)
H04L 5/00 (2006.01)
(Continued)

(52) U.S. Cl.
CPC ....... *H04W 72/1273* (2013.01); *H04L 5/0005* (2013.01); *H04W 72/04* (2013.01); *H04W 72/23* (2023.01); *H04W 92/10* (2013.01)

(58) Field of Classification Search
CPC ............................................... H04W 72/1273
See application file for complete search history.

(56) References Cited

U.S. PATENT DOCUMENTS

2007/0133390 A1* 6/2007 Luo ..................... H04L 27/2655
370/208
2008/0148127 A1* 6/2008 Miyata .................. H04L 1/0064
714/755
(Continued)

FOREIGN PATENT DOCUMENTS

JP 2014-072759 A 4/2014
JP 2014-143606 A 8/2014
WO 2015/182742 A1 12/2015

OTHER PUBLICATIONS

"RAN4#77 Meeting report", R4-160002, 3GPP TSG-RAN WG4 Meeting #77, Anaheim, USA, Oct. 16-20, 2015.
(Continued)

Primary Examiner — Kevin M Cunningham
(74) Attorney, Agent, or Firm — ScienBiziP, P.C.

(57) ABSTRACT

A terminal apparatus includes, a first reception unit configured to receive a first synchronization signal with a first subcarrier spacing, a second reception unit configured to receive a second synchronization signal with the first subcarrier spacing, a detection unit configured to detect an identity from the first synchronization signal and/or the second synchronization signal, and a third reception unit configured to receive a first reference signal, based on the identity, with a second subcarrier spacing different from the first subcarrier spacing, wherein, the first reference signal is (Continued)

arranged in a time resource and a frequency resource predetermined for the second subcarrier spacing.

5 Claims, 17 Drawing Sheets

(51) Int. Cl.
*H04W 72/04* (2023.01)
*H04W 72/23* (2023.01)
*H04W 92/10* (2009.01)

(56) References Cited

U.S. PATENT DOCUMENTS

| | | | |
|---|---|---|---|
| 2010/0278132 A1* | 11/2010 | Palanki | H04L 5/0053 370/329 |
| 2013/0089065 A1* | 4/2013 | Koorapaty | H04W 56/002 370/330 |
| 2013/0215823 A1* | 8/2013 | Shin | H04L 27/2611 370/328 |
| 2014/0092831 A1 | 4/2014 | Saito | |
| 2017/0195028 A1 | 7/2017 | Shimezawa et al. | |
| 2017/0311315 A1* | 10/2017 | Islam | H04W 74/0833 |
| 2018/0146465 A1 | 5/2018 | Li et al. | |
| 2018/0270717 A1* | 9/2018 | Kakishima | H04W 24/10 |
| 2019/0052503 A1 | 2/2019 | Hayashi et al. | |
| 2019/0230696 A1* | 7/2019 | Kim | H04W 74/0833 |

OTHER PUBLICATIONS

Samsung, "Time and frequency synchronization on additional type carriers", R1-114220, 3GPP TSG RAN WG1 Meeting #67, San Francisco, USA, Nov. 14-18, 2011.
"NR Numerology Design Principles", R1-165112, 3GPP TSG-RAN WG1 #85, May 23-27, 2016, Nanjing, China.
Huawei, Hisilicon. "WF on NR forward compatibility", R1-165628, 3GPP TSG RAN WG1 #85, Nanjing, China, May 23-28, 2016.
NTT Docomo. "New SID Proposal: Study on New Radio Access Technology", RP-160671, 3GPP TSG RAN Meeting #71, Göteborg, Sweden, Mar. 7-10, 2016.
Samsung. "Discussion on phase noise modeling", R1-163984, 3GPP TSG RAN WG1 Meeting #85, Nanjing, China May 23-27, 2016.
Huawei et al., "NB-IOT—downlink physical layer concept description", R1-156462, 3GPP TSG RAN WG1 Meeting #83, Anaheim, USA, Nov. 15-22, 2015, p. 1-11.
Kazuaki Takeda, "Status Report to TSG", RP-161304, 3GPP RAN #72 Busan, Korea, Jun. 13-16, 2016.
Panasonic, "Summary of Informal Email Discussion on other M-PDCCH issues", R1-157478 3GPP TSG RAN WG1 Meeting #83, Anaheim, USA, Nov. 15-22, 2015.

* cited by examiner

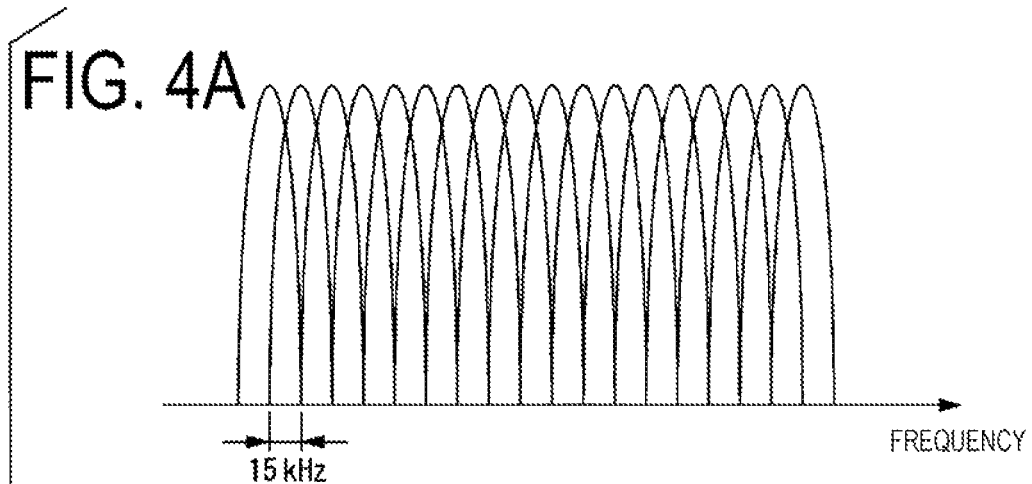
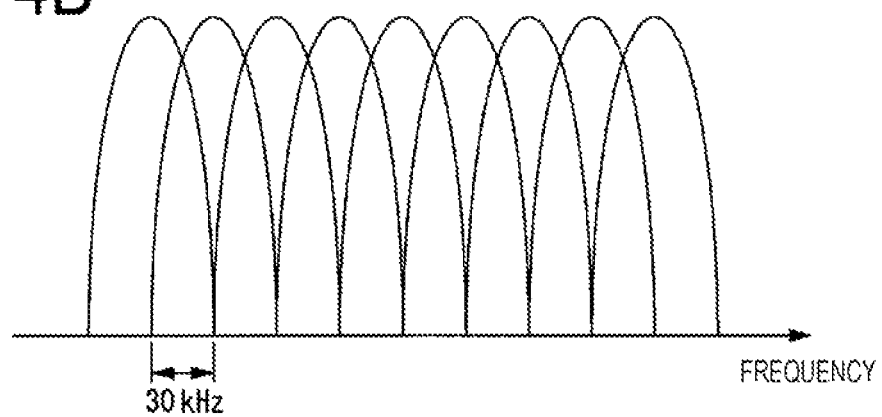
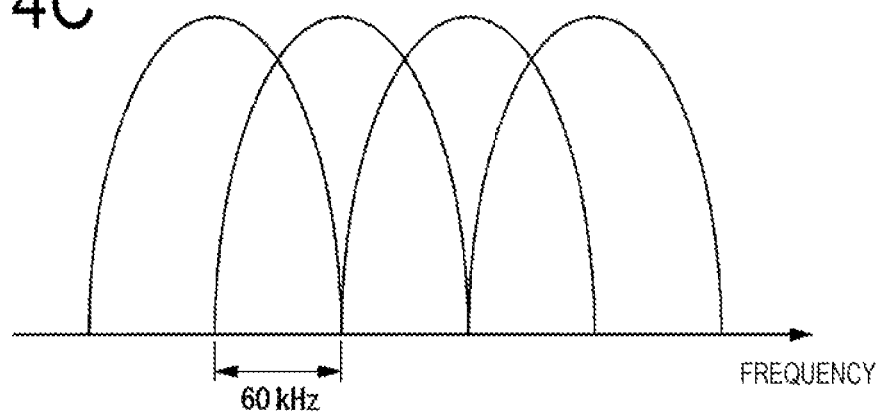

TERMINAL APPARATUS, COMMUNICATION METHOD, AND INTEGRATED CIRCUIT

This application claims priority based on Japanese Patent Application No. 2016-149692 filed on Jul. 29, 2016, the contents of which are incorporated herein by reference.

TECHNICAL FIELD

One aspect of the present invention relates to a terminal apparatus, a communication method, and an integrated circuit.

BACKGROUND ART

Radio access schemes and wireless networks that realize higher speed data communication (hereinafter referred to as "Long Term Evolution: LTE" or "Evolved Universal Terrestrial Radio Access: EUTRA"), by utilizing cellular mobile communication wireless access schemes and wireless network (hereinafter referred to as "Long Term Evolution-Advanced: LTE-A" or "Advanced Evolved Universal Terrestrial Radio Access: A-EUTRA") as well as broader band frequencies, have been studied in the 3rd Generation Partnership Project (3GPP). In addition, studies on a radio access scheme and a wireless network that realize still higher speed data communication (hereinafter referred to as "New Radio: NR" or "5th Generation Mobile Communications: 5G" or "Radio Technology beyond LTE") have started (see NPL 1, 2, 3, 4). In LTE, LTE-A, a base station apparatus is also referred to as an evolved NodeB (eNodeB) and a terminal apparatus is also referred to as an User Equipment (UE), LTE, LTE-A, are cellular communication systems in which multiple areas are arranged in a cellular structure, with each of the multiple areas being covered by a base station apparatus. A single base station apparatus may manage multiple cells.

In NR, communication using a plurality of different subcarrier spacings has been considered. Therefore, it is necessary for the terminal apparatus to specify which of the plurality of different subcarrier spacings is used to communicate with the base station apparatus.

CITATION LIST

Non Patent Literature

NPL 1: "NR Numerology Design Principles", R1-165112, http://www.3gpp.org/ftp/Meetings_3GPP_SYNC/RAN1/Docs/R1-165112.zip, May 22, 2016

NPL 2: Huawei, HiSilicon, "WF on NR forward compatibility", R1-165628, http://www.3gpp.org/ftp/Meetings_3GPP_SYNC/RAN1/Docs/R1-165628.zip, May 24, 2016

NPL 3: NTT DOCOMO, "New SID Proposal: Study on New Radio Access Technology", http://www.3gpp.org/ftp/TSG_RAN/WG1_RL1/TSGR1_AH/LTE_ChM_1603/Docs/R1-160671.zip, Mar. 9, 2016

NPL 4: Samsung, "Discussion on phase noise modeling", R1-163984, http://www.3gpp.org/ftp/Meetings_3GPP_SYNC/RAN1/Docs/R1-163984.zip, May 22, 2016

SUMMARY OF INVENTION

Technical Problem

However, in NR, which of the plurality of different subcarrier spacings is specified to be used for communication has not been studied, presenting an issue that prevents communication between the base station apparatus and the terminal apparatus from being made efficiently.

One of the purposes of an aspect of the present invention, which has been made in view of the above circumstances, is to provide a terminal apparatus capable of efficiently communicating with a base station apparatus, a communication method used in the terminal apparatus, and an integrated circuit mounted in the terminal apparatus.

Solution to Problem

A first aspect of the present invention, which has been made to solve the above issue, is a terminal apparatus, including a first reception unit configured to receive a first synchronization signal with a first subcarrier spacing, a second reception unit configured to receive a second synchronization signal with the first subcarrier spacing, a detection unit configured to detect an identity from the first synchronization signal and/or the second synchronization signal, and a third reception unit configured to receive a first reference signal, based on the identity, with a second subcarrier spacing different from the first subcarrier spacing, wherein, the first reference signal is arranged in a time resource and a frequency resource predetermined for the second subcarrier spacing.

A second aspect of the present invention is the terminal apparatus according to the first aspect, wherein the terminal apparatus demodulates a first essential system information based on the first reference signal.

A third aspect of the present invention is the terminal apparatus according to the first aspect, further including a reference signal power calculation unit configured to calculate a first reference signal reception power based on the first reference signal.

A fourth aspect of the present invention is the terminal apparatus according to the third aspect, wherein the terminal apparatus reports the first reference signal reception power to a base station apparatus.

A fifth aspect of the present invention, which has been made to solve the above issue, is a method of communication used in a terminal apparatus, the method including, receiving a first synchronization signal with a first subcarrier spacing, receiving a second synchronization signal with the first subcarrier spacing, detecting an identity from the first synchronization signal and/or the second synchronization signal, and receiving a first reference signal, based on the identity, with the second subcarrier spacing different from the first subcarrier spacing, wherein, the first reference signal is arranged in a time resource and a frequency resource predetermined for the second subcarrier spacing.

A sixth aspect of the present invention is the method of communication according to the fifth aspect, wherein a first essential system information is demodulated based on the first reference signal.

A seventh aspect of the present invention is the method of communication according to the fifth aspect, wherein a first reference signal reception power is calculated based on the first reference signal.

An eighth aspect of the present invention is the method of communication according to the seventh aspect, wherein the first reference signal reception power is reported to a base station apparatus.

A ninth aspect of the present invention, which has been made to solve the above issue, is an integrated circuit mounted in a terminal apparatus, the integrated circuit causing the terminal apparatus to perform a series of functions to be performed, the functions including, a first reception function to receive a first synchronization signal with a first subcarrier spacing, a second reception function to receive a second synchronization signal with the first subcarrier spacing, a detection function to detect an identity from the first synchronization signal and/or the second synchronization signal, and a third reception function to receive a first reference signal with the second subcarrier spacing different from the first subcarrier spacing, wherein, the first reference signal is arranged in a time resource and a frequency resource predetermined for the second subcarrier spacing.

A 10th aspect of the present invention is the integrated circuit according to the ninth aspect, wherein the integrated circuit causes a further function to demodulate a first essential system information based on the first reference signal to be performed.

An 11th aspect of the present invention is the integrated circuit according to the ninth aspect, wherein the integrated circuit causes a further function to calculate a first reference signal reception power based on the first reference signal to be performed.

A 12th aspect of the present invention is the integrated circuit according to the ninth aspect, wherein the integrated circuit causes a further function to report the first reference signal reception power to a base station apparatus to be performed.

Advantageous Effects of Invention

According to one aspect of the present invention, a terminal apparatus and a base station apparatus can efficiently communicate with each other.

BRIEF DESCRIPTION OF DRAWINGS

FIGS. 4A to 4C are schematic diagrams, each illustrating an example of subcarrier spacings of subcarriers used for communication between a base station apparatus and a terminal apparatus according to the first embodiment of the present invention.

DESCRIPTION OF EMBODIMENTS

Hereinafter, each embodiment of the present invention is described in detail with reference to the drawings.

First Embodiment

Figure 1:
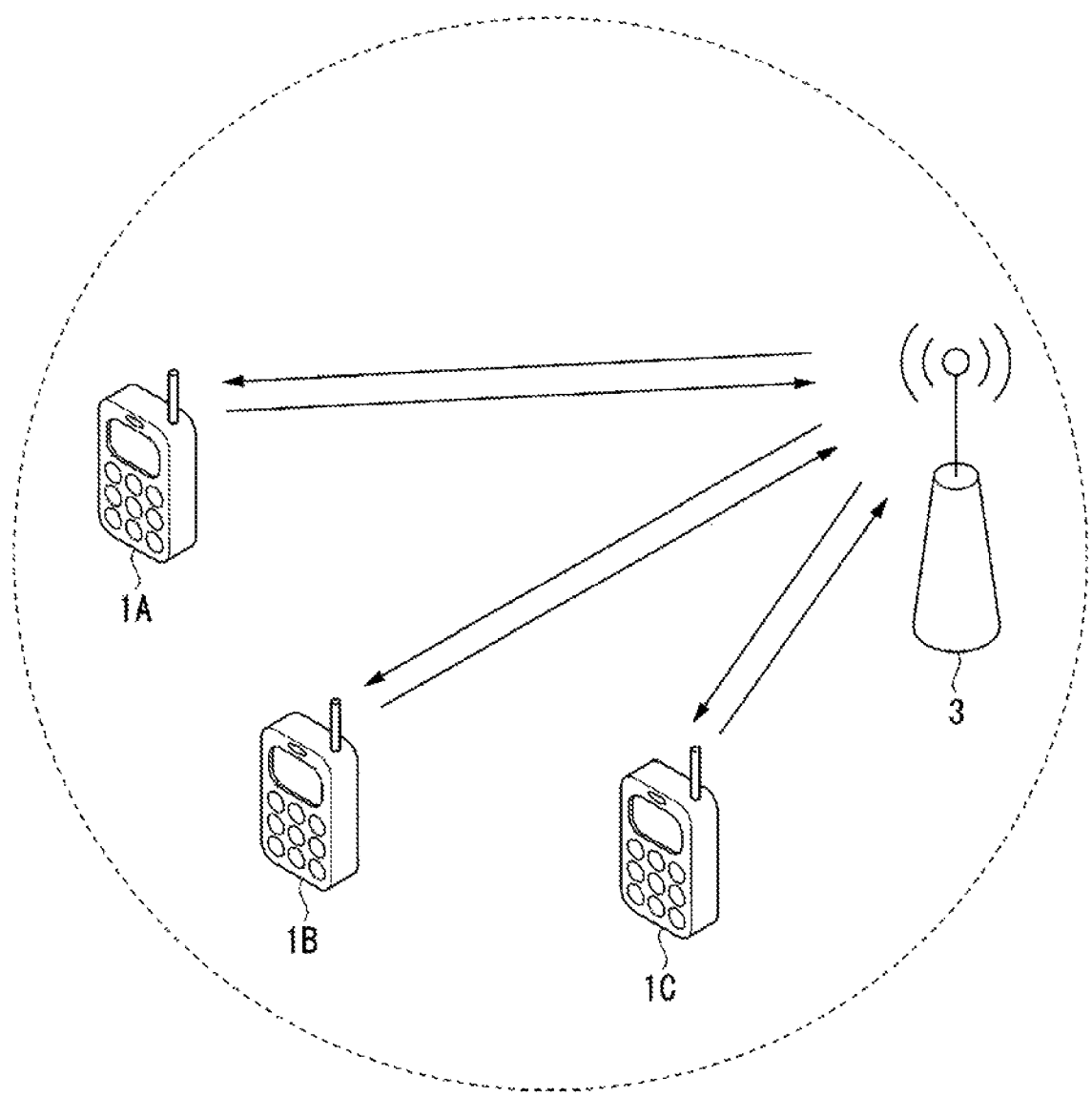
FIG. 1 is a schematic diagram illustrating an example of a configuration of a radio communication system according to the first embodiment of the present invention.

FIG. 1 is a schematic diagram of an example of a radio communication system configuration according to the first embodiment of the present invention.

In FIG. 1, the radio communication system is configured including a terminal apparatus 1, a base station apparatus 3, and a mobility management entity (MME)/gateway (GW) apparatus 4 in the core network (not illustrated). A base station apparatus 3 is configured including the base station apparatus 3A and the base station apparatus 3B. In a case that the base station apparatus 3 is referred to, it is assumed that both base station apparatuses of the base station apparatus 3A and the base station apparatus 3B are referred to. Further, the base station apparatus 3 includes a plurality of other base station apparatuses (not illustrated) in addition to the base station apparatus 3A and the base station apparatus 3B. Note that, the base station apparatus 3 may include the MME/GW 4. The base station apparatus 3 is connected with the MME/GW 4 by a backhaul link S1 (also referred to as S1 link). The base station apparatus 3A and the base station apparatus 3B are connected by a backhaul link X2 (also referred to as X2 link).

The terminal apparatus 1 communicates with the base station apparatus 3 using the uplink to the base station apparatus 3 and the downlink from the base station apparatus 3 to the terminal apparatus 1.

The base station apparatus 3 forms (manages) a plurality of cells to communicate with the terminal apparatus 1.

Here, a physical channel and a physical signal in the present embodiment will be described.

The following physical channels may be used for the radio communication between the terminal apparatus 1 and the base station apparatus 3.

Physical control channel (PCCH)
Physical shared channel (PSCH)

The PCCH and the PSCH may both include the downlink and the uplink, and downlink control information and: or each subframe of the higher layer and/or a resource unit may indicate whether they are downlink or uplink. In the following description, it is assumed that the respective channels are defined for the uplink and the downlink.

In uplink radio communication from the terminal apparatus 1 to the base station apparatus 3, the following uplink physical channels are used. The uplink physical channels are used by a physical layer for transmission of information output from a higher layer.

Physical uplink control channel (PUCCH)
Physical uplink shared channel (PUSCH)
Physical random access channel (PRACH)

The PUCCH is a channel that is used to transmit uplink control information (UCI). The uplink control information includes a Scheduling Request (SR) to be used to request a PUSCH (UpLink-Shared CHannel (UL-SCH)) resource for initial transmission of downlink Channel State Information (CSI), and HARQ control information (a Hybrid Automatic Repeat request ACKnowledgement (HARQ-ACK)) for downlink data (a transport block, a medium access control protocol data unit (MAC PDU), a downlink-shared channel (DL-SCH), a Physical Downlink Shared Channel (PDSCH)). The HARQ-ACK indicates an acknowledgement (ACK) or a negative-acknowledgement (NACK). Here, ACK indicates that the terminal apparatus 1 succeeded in receiving the DL-SCH/PDSCH, and NACK indicates that the terminal apparatus 1 failed in receiving the DL-SCH/PDSCH.

The CSI includes a Channel Quality Indicator (CQI), a Precoding Matrix Indicator (PMI), a Precoding Type Indicator (PTI), and a Rank Indicator (RI). Indication may be used as a notation for each indicator.

The PUSCH is used for transmission of uplink data (UpLink-Shared CHannel (UL-SCH)). In addition the PUSCH is used to transmit (notify) various higher layer parameters, various configuration information, and measurement information (for example, measurement report) related to the terminal apparatus 1 as the random access message 3, the layer 2 message, and the layer 3 message. In addition, the PUSCH may also be used to transmit (notify) the uplink control information. Furthermore, the PUSCH may be used to transmit the HARQ-ACK and/or the channel state information along with the uplink data not including the random access message 3. Furthermore, the PUSCH may be used to transmit only the channel state information or to transmit only the HARQ-ACK and the channel state information. In addition, radio resource allocation information for the physical uplink shared channel is indicated by a physical downlink control channel.

The PRACH is used to transmit a random access preamble (random access message 1). The PRACH is used for indicating the initial connection establishment procedure, the handover procedure, the connection re-establishment procedure, synchronization (timing adjustment)for uplink transmission, and/or the PUSCH (UL-SCH) resource request.

The following downlink physical channels are used for downlink radio communication from the base station apparatus 3 to the terminal apparatus 1. The downlink physical channels are used by the physical layer for transmission of information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH (physical broadcast channel) is used for broadcasting a Master Information Block (MIB, a Broadcast Channel (BCH), Essential System Information) that is shared by the terminal apparatuses 1.

The PCFICH (physical control format indicator channel) is used for transmission of information indicating a region (OFDM symbols) used for transmission of the PDCCH.

The PHICH (Physical hybrid automatic repeat request indicator channel) is used to transmit a HARQ indicator (HARQ feedback response information, HARQ control information) indicating an ACKnowledgement (ACK) and/or Negative ACKnowledgement (NACK) for the uplink data (Uplink Shared CHannel (UL-SCH)) received by the base station apparatus 3.

The PDCCH (Physical downlink control channel) and/or the EPDCCH (Enhanced physical downlink control channel) are used to transmit downlink control information (DCI). The downlink control information is also referred to as DCI format. The downlink control information includes downlink grant, and/or uplink grant. The downlink grant is also referred to as downlink assignment and/or downlink allocation.

One downlink grant is used for the scheduling of a single PDSCH in a single serving cell. The downlink grant is used for the scheduling of the PDSCH within the same subframe as the subframe on which the downlink grant is transmitted.

One uplink grant is used for the scheduling of a single PUSCH in a single serving cell. The uplink grant is used for the scheduling of a PUSCH within the fourth or later subframe from the subframe on which the uplink grant is transmitted.

The uplink grant transmitted on the PDCCH includes the DCI format 0. The transmission scheme of the PUSCH corresponding to the DCI format 0 is a single antenna port. The terminal apparatus 1 uses a single antenna port transmission scheme for the PUSCH transmission corresponding to the DCI format 0. The PUSCH to which the single antenna port transmission scheme is applied is used for the transmission of one codeword (one transport block).

The uplink grant transmitted on the PDCCH includes the DCI format 4. The transmission scheme of the PUSCH corresponding to the DCI format 4 is the closed loop spatial multiplexing. The terminal apparatus 1 uses a closed loop spatial multiplexing transmission scheme for the PUSCH transmission corresponding to the DCI format 4. The PUSCH to which the closed-loop spatial multiplexing transmission scheme is applied is used for transmission of up to two codewords (up to two transport blocks).

Cyclic Redundancy Check (CRC) parity bits attached to the downlink grant and/or uplink grant are scrambled with a Cell-Radio Network Temporary Identifier (C-RNTI), a Temporary C-RNTI, or a Semi Persistent Scheduling (SPS) C-RNTI. The C-RNTI and/or the SPS C-RNTI are identifiers for identifying a terminal apparatus within a cell. The Temporary C-RNTI is used during a contention based random access procedure.

The C-RNTI (an identifier (identifying information) of a terminal apparatus) is used to control the PDSCH and/or the PUSCH in one subframe. The SPS C-RNTI is used to cyclically allocate a resource of the PDSCH and/or the PUSCH. The Temporary C-RNTI is used to schedule retransmission of a random access message 3 and/or transmission of a random access message 4.

The PDSCH (Physical downlink shared channel) is used to transmit downlink data (downlink shared channel (DL-SCH)) The PDSCH is used to transmit a random access message 2 (random access response). The PDSCH is used for the transmission of a handover command.

The random access response includes a random access response grant. The random access response grant is an uplink grant transmitted on the PDSCH. The terminal apparatus 1 uses a single antenna port transmission scheme for the PUSCH transmission corresponding to the random access response grant and/or for the PUSCH retransmission for the same transport block.

The PMCH is used to transmit multicast data (multicast channel (MCH)).

The following downlink physical signal is used in the downlink radio communication. The downlink physical signals are not used for transmission of information output from the higher layer, but are used by the physical layer.

Synchronization signal (SS)
Downlink reference signal (DL RS)

The synchronization signal is used by the terminal apparatus 1 for the synchronization in the frequency domain and the time domain in the downlink.

The downlink reference signal is used for the terminal apparatus 1 to perform channel compensation of the downlink physical channel. The downlink reference signal is used for the terminal apparatus 1 to calculate the downlink channel state information.

According to the present embodiment, the following seven types of downlink reference signals are used.

Cell-specific reference signal (CRS)
UE-specific reference signal (UERS) relating to the PDSCH.
Demodulation reference signal (DMRS) relating, to the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The downlink physical channel and/or the downlink physical signal are collectively referred to as a downlink signal. The uplink physical channel and/or the uplink physical signal are collectively referred to as an uplink signal. The downlink physical channel and/or the uplink physical channel are collectively referred to as a physical channel. The downlink physical signal and/or the uplink physical signal are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) and/or a MAC Protocol Data Unit (PDU). A Hybrid Automatic Repeat reQuest (HARQ) control is performed for each transport block in the MAC layer. The transport block is a unit of data that the MAC layer delivers to the physical layer. In the physical layer, the transport block is mapped to a codeword, and coding processing is performed for each codeword.

Next, an example of a schematic configuration of a radio frame according to the first embodiment of the present invention will be described.

The size of various fields in the time domain is expressed by the number of time units Ts, which is 1/(15000*2048) second. The length of a radio frame is: Tf=307200*Ts=10 ms. Each of the radio frames may include ten contiguous subframes in the time domain. The length of each subframe is: Tsubframe=30720*Ts=1 ms. Each of the subframes i may include two contiguous slots in the time domain. The two contiguous slots in the time domain are a slot having a slot number $n_s$ of 2i in the radio frame and a slot having a slot number $n_s$ of 2i+1 in the radio frame. The length of each slot is: Tslot=153600*ns=0.5 ms. Each of the radio frames includes ten contiguous subframes in the time domain. Each of the radio frames includes 20 contiguous slots ($n_s$=0, 1, . . . , 19) in the time domain.

In the present embodiment, the following two types of uplink reference signals are also used to determine (measure, calculate) a TA (Timing Advance, Time alignment). A TA is a transmission timing such as a PUSCH transmission or a PUCCH transmission.

Demodulation reference signal (DMRS)
Sounding reference signal (SRS)

The DMRS (demodulation reference signal) is transmitted together with the PUCCH (Physical Uplink Control Channel) and/or the PUSCH (Physical Uplink Shared Channel). The DMRS is stored in the resource block of the PUCCH and/or the PUSCH, and time-multiplexed. The base station apparatus 3 uses the DMRS in order to perform channel compensation of the PUSCH and/or the PUCCH. Hereinafter transmission of both of the PUSCH and the DMRS is referred to simply as transmission of the PUSCH. Hereinafter, transmission of both of the PUCCH and the DMRS is referred to simply as transmission of the PUCCH.

SRS (sounding reference signal) is used to measure the reception quality and adjust the timing, in order to apply the frequency scheduling. Further, the SRS is not associated with transmission of the PUSCH or transmission of the PUCCH. The base station apparatus 3 uses the SRS to measure the channel state. The SRS is transmitted in a prescribed symbol in the uplink subframe. Specifically, the SRS is transmitted in the last SC-FDMA symbol and/or the SC-FDMA symbol in the Up PTS. In the present embodiment, the base station apparatus 3A and the base station apparatus 3B may grasp the channel state or measure the uplink timing by using the SRS.

As described above, the physical channel corresponds to a set of resource elements that transmit information output from the higher layer. The physical signal is used in the physical layer and does not transmit information output from the higher layer. Namely, higher layer control information such as radio resource control (RRC) message and system information (SI) is transmitted on the physical channel.

Also, as described above, the physical downlink channel includes, the physical downlink shared channel (PDSCH), the physical broadcast information channel (PBCH), the physical multicast channel (PMCH), the physical control format indicator channel (PCFICH), the physical downlink control channel (PDCCH), the physical hybrid ARQ indicator channel (PHICH), and the extended physical downlink control channel (EPDCCH). It should be noted that a physical downlink shared channel (PDSCH) and a physical uplink control channel (PUCCH) may be transmitted as a physical shared channel (PSCH).

Also, as described above, the downlink physical signal has various reference signals and various synchronization signals. The downlink reference signal includes a cell-specific reference signal (CRS), a terminal-specific reference signal (UERS), and a channel state information reference signal (CSI-RS). The synchronization signal includes a primary synchronization signal (PSS) and a secondary synchronization signal (SSS).

Synchronization Signal (SS) is constituted by three kinds of Primary Synchronization Signals (PSS) and the Secondary Synchronization Signal (SSS) which is constituted by 31 kinds of codes that are interleaved in the frequency domain. Combination of Primary Synchronization Signal and Secondary Synchronization Signal indicates 504 cell identifiers (the physical cell ID (PCI): Physical layer Cell Identity, Physical Cell Identity, Physical Cell identifier) for identifying the base station apparatus, and frame timing for radio synchronization. The terminal apparatus identities the cell identity of a received synchronization signal by cell search.

Information elements necessary for configuring various physical channels physical signals (PRACH, PUSCH, SRS, UL DMRS, CRS, CSI-RS, PDCCH, PDSCH, PSS/SSS, DL DMRS, PBCH, PMCH, and the like) are constituted by shared configuration information shared between terminal apparatuses in the same cell and specific configuration information configured for each terminal apparatus. The shared configuration information may be transmitted by system information. Further, in a case of reconfiguration, the shared configuration information may be transmitted as specific information.

Next, configurations of radio frame according to the present embodiment will be described below.

Figure 2:
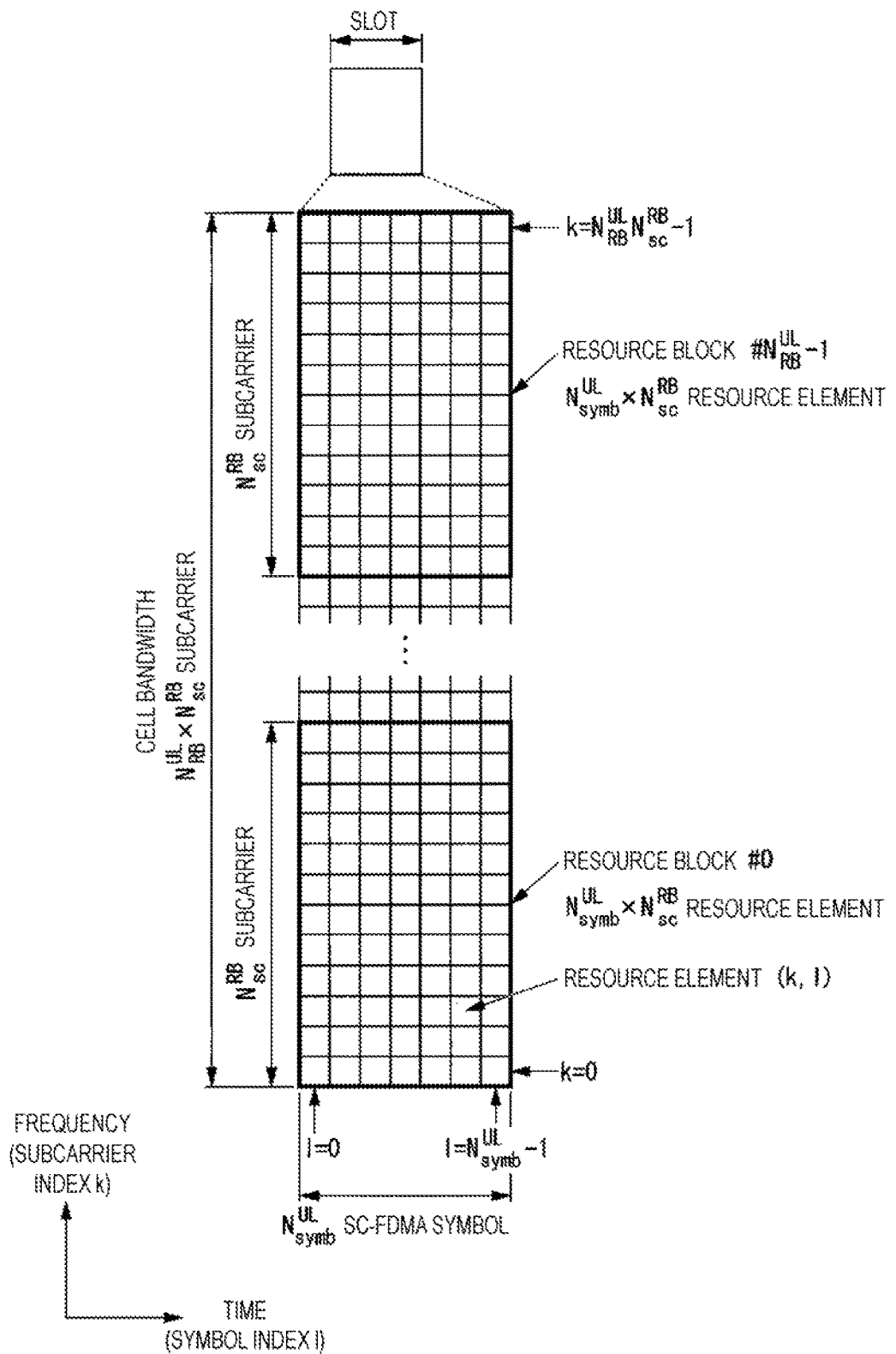
FIG. 2 is a diagram illustrating an example of a schematic configuration of an uplink slot according to the first embodiment of the present invention.

FIG. 2 is a diagram illustrating an example of a schematic configuration of an uplink slot according to the first embodiment of the present invention.

Each of the radio frames is 10 ms in length. Furthermore, each of the radio frames may be constituted by 20 slots. Each of the slots is 0.5 ms in length and assigned a number from 0 to 19. Each of the subframes is 1 ms in length and is defined by two consecutive slots. The i-th subframe within a radio frame is constituted by the (2×i)-th slot and the (2×i+1)th slot. Namely, 10 subframes can be used for each spacing of 10 ms.

The signal and/or the physical channel transmitted in each of the slots is expressed by a resource grid. The resource grid is defined by a plurality of subcarriers and a plurality of OFDM symbols. The number of subcarriers constituting one slot depends on the uplink bandwidth of the cell. The number of OFDM symbols constituting one slot is 7 in the case of the Normal Cyclic Prefix (NCP). In addition, the number of OFDM symbols constituting one slot is 6 in the case of Extended Cyclic Prefix (ECP) in which a Cyclic Prefix (CP) longer than the NCP is assigned. Namely, the number of OFDM symbols constituting one slot may be based on the length of CP to be assigned. Each element within the resource grid is referred to as a resource element. The resource element is identified by using a subcarrier number and an OFDM symbol number.

A resource block is used to express mapping of a certain physical uplink channel (such as the PUSCH) to resource elements. For the resource block, a virtual resource block and a physical resource block are defined. A certain physical uplink channel is first mapped to a virtual resource block. Then, the virtual resource block is mapped to the physical resource block. In the case of the NCP, one physical resource block is defined by seven contiguous OFDM symbols in the time domain and by 12 contiguous subcarriers in the frequency domain. Namely one physical resource block is constituted by (7*12) resource elements. In case of the ECP, one physical resource block is defined by six contiguous OFDM symbols in the time domain and by 12 contiguous subcarriers in the frequency domain. Namely, one physical resource block is constituted by (6*12) resource elements.

Furthermore, one physical resource block corresponds to one slot in the time domain and corresponds to 180 kHz in the frequency domain. Physical resource blocks are numbered from 0 in the frequency domain.

FIGS. 3A to 3E are diagrams illustrating an example of a schematic configuration of a subframe (subframe type, resource unit, time interval (TI)) in the time domain.

Figure 3A:
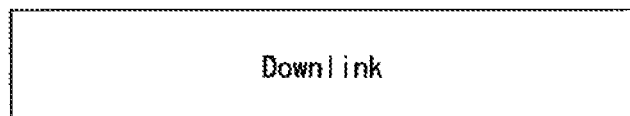
FIGS. 3A to 3E are schematic diagrams, each illustrating an example of a subframe used for communication between a base station apparatus and a terminal apparatus according to the first embodiment of the present invention.

FIG. 3A illustrates a case in which all the time resources in the subframe are resources of downlink. FIG. 2B illustrates a case in which a part of the resources at the head in the subframe is for downlink (indicated by "D"), and interposing a gap, the next resource is for uplink communication. For example, as an example of the operation of FIG. 3A and/or FIG. 3B, the downlink resource is applied as a downlink control channel, and in a case that the downlink control information being transmitted on the downlink control channel indicates a downlink, FIG. 3A is regarded as being the configuration of the time resource, while in a case that the uplink is indicated, FIG. 3A is regarded as being the configuration of the time resource and the rest of the time resource interposing a gap is used for uplink communication.

Figure 3B:
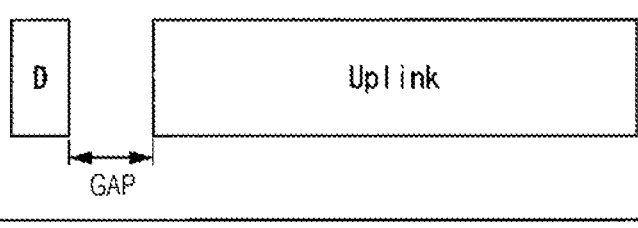
Figure 3C:
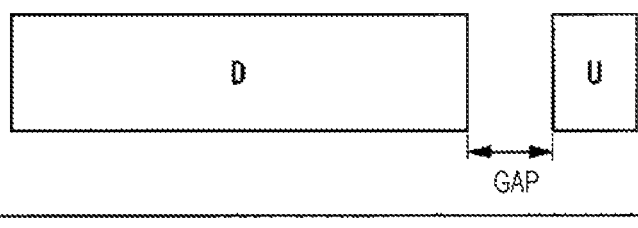

FIG. 3C is the case in which the resource is for the downlink at the head of the subframe but the ratio of downlink resource and uplink resource in the subframe is different from FIG. 3B. An example of this operation is to receive control information and downlink data in the downlink resource, regarding the uplink resource interposing the gap (indicated as U) to be used for HARQ-ACK on the downlink data.

Figure 3D:
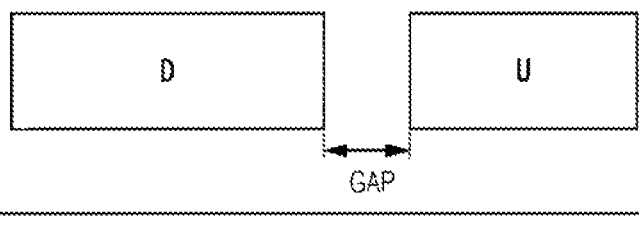

FIG. 3D is an example of a case in which the ratio of the downlink resource and the uplink resource is different from that in FIG. 3B and/or FIG. 3C. For example, in the example illustrated in FIG. 3D, the downlink control information and the downlink data communication, and/or the uplink control information and the uplink data communication can be respectively performed with the downlink resource and/or the uplink resource.

Figure 3E:
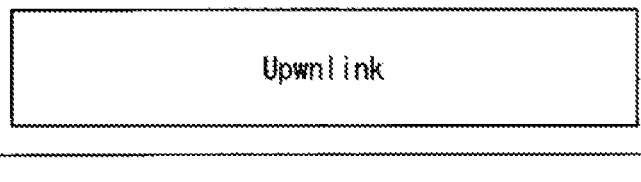

FIG. 3E illustrates a case in which all the resources in the subframe are resources of uplink. For example, in a case in which a plurality of subframes are used for transmitting a large amount of uplink data, by receiving information from a downlink control information resource in the higher layer and/or in the subframe earlier in time, indicating that all subsequent resources are uplink resources, the terminal apparatus can consider the subframes to be the subframe illustrated in FIG. 3E.

The time length (and/or the time intervals) of the downlink part the time resource indicated as Downlink and/or D), the gap, and the uplink part (the time resource indicated as Uplink and/or in FIGS. 3A to 3E may be configured in the higher layer by the base station apparatus 3, or may be configured in the units of a radio resource and/or a sub-frame in the downlink control information.

Next, subcarrier spacings of subcarriers used by the base station apparatus 3 to communicate with the terminal apparatus 1 according to the first embodiment of the present invention will be described.

FIGS. 4A to 4C are schematic diagrams illustrating an example of subcarrier spacings of subcarriers used for communication between the base station apparatus 3 and the terminal apparatus 1 according to the first embodiment of the present invention.

FIG. 4A illustrates an example where a subcarrier spacing of subcarriers used for communication between the base station apparatus 3 and the terminal apparatus 1 is 15 kHz. FIG. 3B illustrates an example where a subcarrier spacing of subcarriers used for communication between the base station apparatus 3 and the terminal apparatus 1 is 30 kHz. FIG. 3C illustrates an example where a subcarrier spacing of subcarriers used for communication between the base station apparatus 3 and the terminal apparatus 1 is 60 kHz.

The base station apparatus 3 and/or the terminal apparatus 1 may communicate using subcarriers having different subcarrier spacings. Namely, the communication between the base station apparatus 3 and the terminal apparatus 1 may be performed using one or more subcarriers of a plurality of subcarrier spacings as illustrated in FIGS. 4A to 4C.

Here, the subcarrier spacing illustrated in FIG. 4B has, for example, a subcarrier spacing of the subcarrier spacing illustrated in FIG. 4A raised to the first power of 2, and the subcarrier spacing illustrated in FIG. 4C has, for example, a subcarrier spacing of the subcarrier spacing illustrated in FIG. 4A raised to the second power of 2. Namely, the base station apparatus 3 and the terminal apparatus 1 may perform communication using a subcarrier of the prescribed subcarrier spacing, and using subcarriers of the prescribed subcarrier spacing raised to the power of 2.

It is to be noted that the subcarrier spacing illustrated in FIG. 4 is merely an example. Any subcarrier spacing may be used, a subcarrier having subcarrier spacing of that any subcarrier spacing multiplied by any positive number such as two or three may be used, or a subcarrier having subcarrier spacing of that any subcarrier spacing multiplied by the power of any positive number such as the power of 3 or the power of 4 may also be used.

Figure 5:
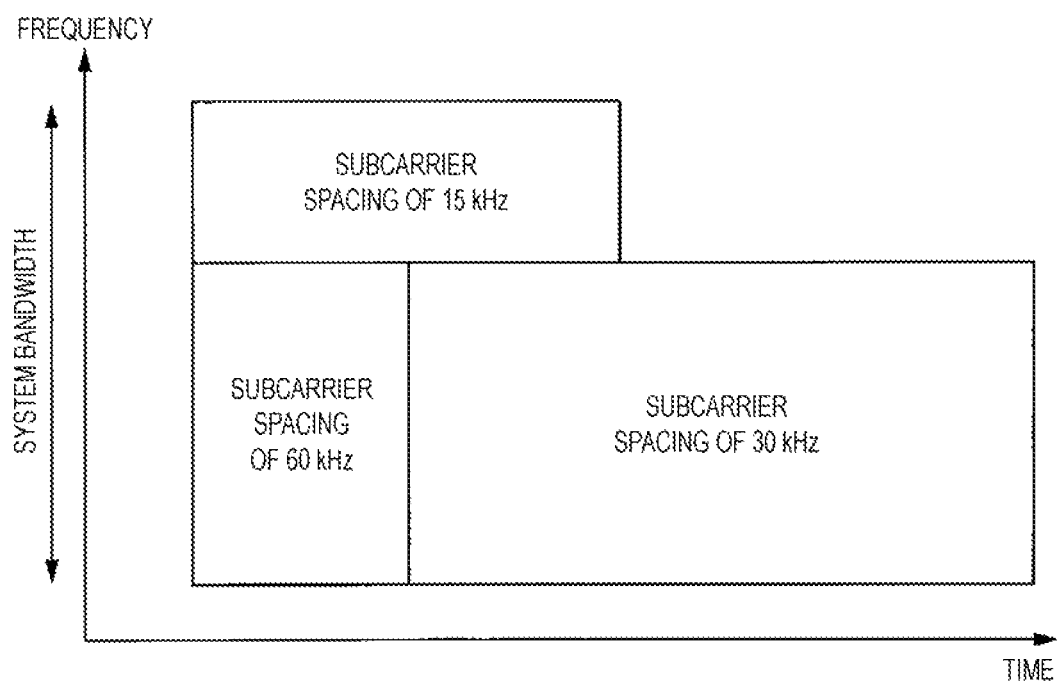
FIG. 5 is a schematic diagram illustrating an example of frequency resource allocation for each of subcarriers of different subcarrier spacings according to the first embodiment of the present invention.

FIG. 5 is a schematic diagram illustrating an example of frequency resource allocation for each of subcarriers of different subcarrier spacings according to the first embodiment of the present invention.

Figure 6:
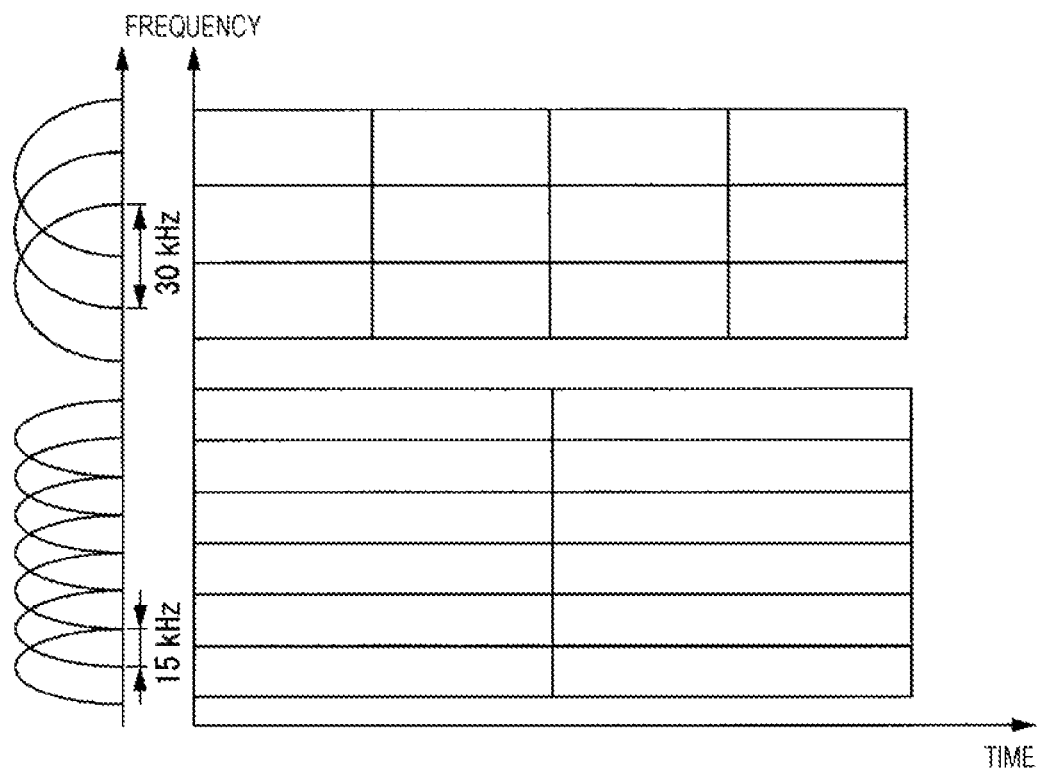
FIG. 6 is a schematic diagram illustrating an example of a resource grid for each of subcarriers of different subcarrier spacings according to the first embodiment of the present invention.

Further, FIG. 6 is a schematic diagram illustrating an example of a resource grid for each subcarrier of different subcarrier spacings according to the first embodiment of the present invention.

In the examples illustrated in FIG. 5 and FIG. 6, out of the system bandwidth used for NR on the frequency axis, communications using subcarriers with subcarrier spacings of 15 kHz and subcarriers with subcarrier spacing of 60 kHz are allocated frequency resources respectively. In the examples illustrated in FIGS. 5 and 6, on the frequency axis, frequency resources allocated to communication using subcarriers with subcarrier spacings of 60 kHz are also allocated to communication using subcarriers with subcarrier spacings of 30 kHz.

Next, in the terminal apparatus 1, the initial access procedure to the base station apparatus 3 will be described.

In the initial access, the terminal apparatus 1 performs the following processing.
F1: ID detection
F2: Coarse time domain synchronization
F3: Coarse frequency synchronization
F4: High precision time/frequency synchronization
F5: Frame synchronization
F6: Subframe synchronization The terminal apparatus 1 searches (performs a cell (beam) search of) a connectable cell (beam) of the base station apparatus 3, as an initial access. Each cell (beam) is identified by its identity (a physical cell ID, a beam a reference signal ID, and the like). The terminal apparatus detects a primary synchronization signal (PSS) transmitted by the base station apparatus 3 in a prescribed cycle. For example, the terminal apparatus 1 may identify (determine, detect, identify) an identity (a physical cell ID, a beam ID, and the like) (enabling F1, F2, F3), by detecting a primary synchronization signal (PSS) transmitted by the base station apparatus 3 in a prescribed cycle. At this time, in a case that the time position in the radio frame of the PSS is specified in the specifications, synchronization of the radio frames is also possible (F5 is enabled).

Further, the terminal apparatus 1 detects a secondary synchronization signal (SSS) transmitted by the base station apparatus 3 in a prescribed cycle. For example, the terminal apparatus 1 may identify (determine, detect, and identify) an identity (a physical cell ID, a beam ID, a reference signal ID, and the like) by detecting a secondary synchronization signal (SSS) transmitted by the base station apparatus 3 in a prescribed cycle (F1 is enabled). At this time, if the time position of the secondary synchronization signal (SSS) and the signal generation scheme of the secondary synchronization signal (SSS) are based on the subframe or the slot in the radio frame, subframe synchronization can also be performed (F6 is enabled).

In addition, by detecting the primary synchronization signal (PSS), the terminal apparatus 1 may obtain information related to identity (a physical cell ID, a beam ID, a reference signal ID, and the like), and detect the secondary synchronization signal (SSS). The terminal apparatus 1 may identify (determine, detect) the identity (a physical cell ID, a beam ID, and the like) by detecting the primary synchronization signal (PSS) and the secondary synchronization signal (SSS). In this case, unless the information related to the identity (a physical cell ID, a beam ID) is obtained, the secondary synchronization signal (SSS) cannot be correctly detected.

Namely, the terminal apparatus 1 specifies (determines, detects, identifies) the identity (the physical cell ID, the beam ID, the reference signal ID and the like) by detecting one or both of the primary synchronization signal (PSS) and the secondary synchronization signal (SSS) by cell (beam) search. The terminal apparatus 1 can receive the physical broadcast channel (PBCH) by specifying (determining, detecting, identifying) the identity (physical cell ID, beam ID, reference signal ID, and the like).

In the following description, the primary synchronization signal (PSS) is also referred to as a first synchronization signal and the secondary synchronization signal (SSS) is also referred to as a second synchronization signal.

In the physical broadcast channel (PBCH), the master information block (MIB) is broadcast. In the master information block (MIB), information such as subcarrier spacing, system bandwidth (dl-Bandwidth), time/frequency offset, time/frequency resources, system frame number, Reference point) may be included. Information on the reference point may include information such as the center frequency of the master information block (MIB), the position of the reference signal, the frequency range of the system band in which the master information block (MIB) is transmitted (broadcast).

Note that the information on the reference point may be included in the second synchronization signal (SSS), or may be included in the third synchronization signal different from the first synchronization signal (PSS) or the second synchronization signal (SSS), or may be included in other control information, parameters, or the like. In this case, the terminal apparatus 1 may detect the MIB based on the reference point or by blind decoding. Further, the reference position may be predetermined.

A dedicated master information block (MIB) may be used for each subcarrier spacing, or a master information block (MIB) with a different subcarrier spacing may be included in a master information block (MIB) with a certain subcarrier spacing.

Figure 7:
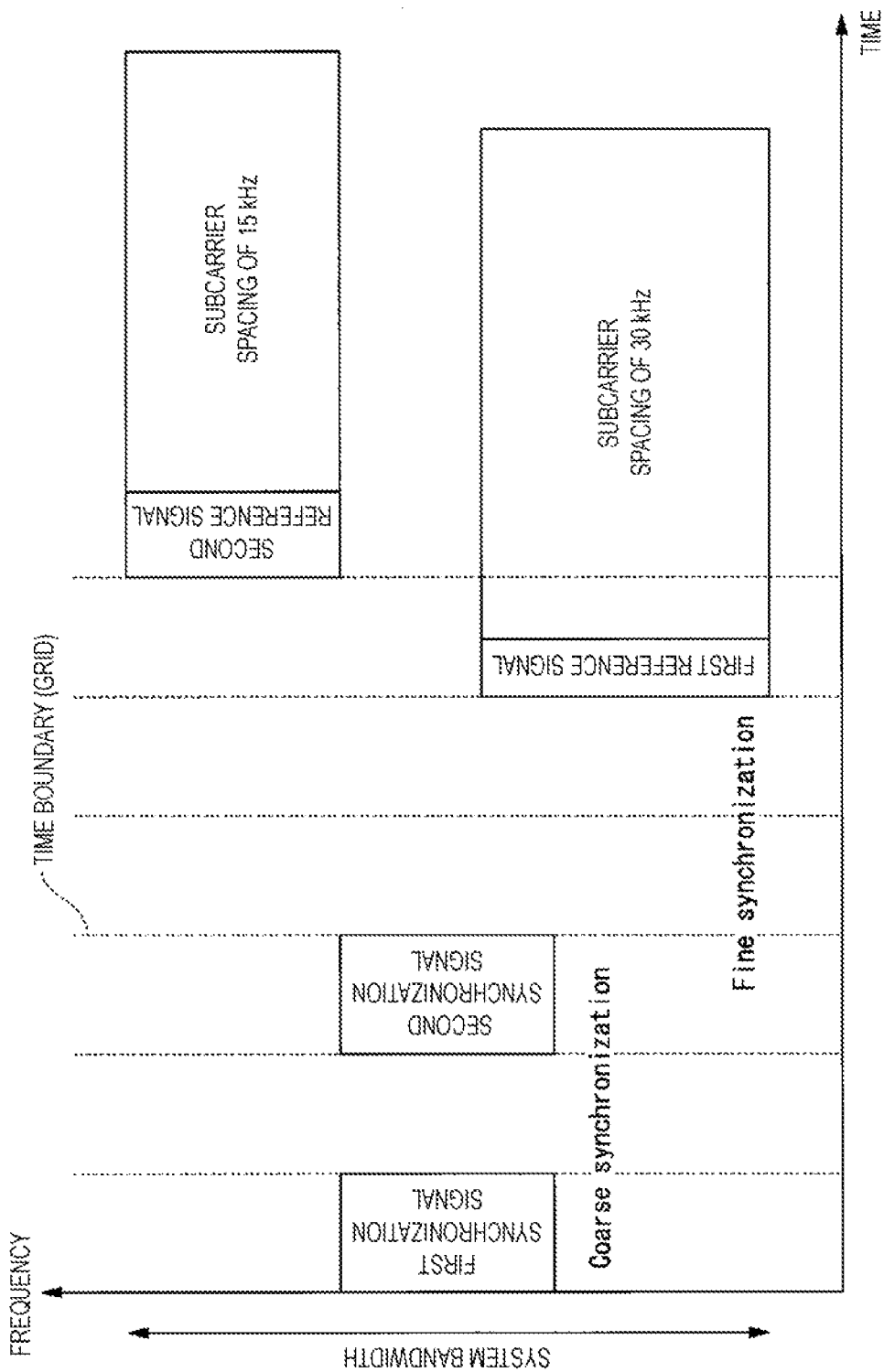
FIG. 7 is a schematic diagram illustrating an example of an initial access procedure between the base station apparatus and the terminal apparatus according to the first embodiment of the present invention.

FIG. 7 is a schematic diagram illustrating an example of an initial access procedure between the base station apparatus 3 and the terminal apparatus 1 according to the first embodiment of the present invention.

The base station apparatus 3 transmits the first synchronization signal (PSS) in a prescribed cycle with a first subcarrier spacing (for example, a subcarrier spacing of 15 kHz).

In addition, the base station apparatus 3 transmits the second synchronization signal (SSS) in a prescribed cycle with a first subcarrier spacing (for example, a subcarrier spacing of 15 kHz).

The terminal apparatus 1 performs a cell search (beam search), and detects a first synchronization signal (PSS) transmitted from the base station apparatus 3 in a prescribed cycle. Upon detecting the first synchronization signal (PSS) transmitted with the first subcarrier spacing, the terminal apparatus 1 obtains information related to the identity (the physical cell ID, the beam ID, the reference signal ID, and the like). Upon obtaining the information related to the identity (the physical cell ID, the beam ID, the reference signal ID, and the like), the terminal apparatus 1 detects the second synchronization signal (SSS) transmitted from the base station apparatus 3 in a prescribed cycle.

Here, the synchronization signal frequency (the carrier frequency/the center frequency) is determined in units of rasters of frequency spacings. For example, the terminal apparatus 1 detects a first synchronization signal (PSS) for rasters with spacings of 100 kHz.

Also, the time resource of the second synchronization signal (SSS) may be specified from the first synchronization signal (PSS). The frequency resource of the second synchronization signal (SSS) may be specified from the first synchronization signal (PSS). The time (timing) for searching the second synchronization signal (SSS) may share the time with the first synchronization signal (PSS), and detect the second synchronization signal (SSS) at the time boundary with the first synchronization signal. Also, the time resource of the second synchronization signal (SSS) may be specified from the identity of the first synchronization signal (PSS).

Also, the time resources and/or frequency resources of the first reference signal and/or of the second reference signal may be specified from the time resources and/or frequency resources and/or identity of the first synchronization signal (PSS) and/or of the second synchronization signal (SSS). The range of time resources and/or frequency resources in which the first reference signal and/or the second reference signal are arranged may be specified from the time resources and/or frequency resources and/or identity of the first synchronization signal (PSS) and/or of the second synchronization signal (SSS). The time and/or frequency resources of the first reference signal and/or the second reference signal arranged in the range of the time resource and/or the frequency resource may be detected by the terminal apparatus 1. The first reference signal and/or the second reference signal may have time and/or frequency resources predetermined with arbitrary subcarrier spacings. The terminal apparatus 1 may detect the first reference signal and/or the second reference signal with arbitrary subcarrier spacings.

The terminal apparatus 1 specifies (detects, determines, identifies) the identity (the physical cell ID, the beam ID, the reference signal ID, and the like) according to the first synchronization signal (PSS) and/or the second synchronization signal (SSS). The terminal apparatus 1, based on the identified (detected, determined) identity (the physical cell ID, the beam ID, the reference signal ID, and the like), receives a first reference signal transmitted with a second subcarrier spacing (for example, a subcarrier spacing of 30 kHz) different from the first subcarrier spacing (for example, subcarrier spacing of 15 kHz). The first reference signal is mapped to time resources and/or frequency resources predetermined for the second subcarrier spacing (for example, a subcarrier spacing of 30 kHz). Here, time resources and/or frequency resources are also referred to as resource elements. In other words, the resource elements are predetermined by time resources and/or frequency resources.

As in the illustrated example, the subcarrier spacing with which the second reference signal is transmitted may be the same subcarrier spacing as the subcarrier spacing with which the first synchronization signal and; or the second synchronization signal is transmitted, and the subcarrier spacing with which the first synchronization signal and/or the second synchronization signal is transmitted, the subcarrier spacing with which the first reference signal is transmitted, and the subcarrier spacing with which the second reference signal is transmitted may be different from each other.

Synchronization with sufficiently high accuracy for enabling data communication (for example, window synchronization of Fast Fourier Transform (FF) or compensation of frequency offset), can be performed by using the first reference signal and/or the second reference signal (enabling F4).

Figure 8:
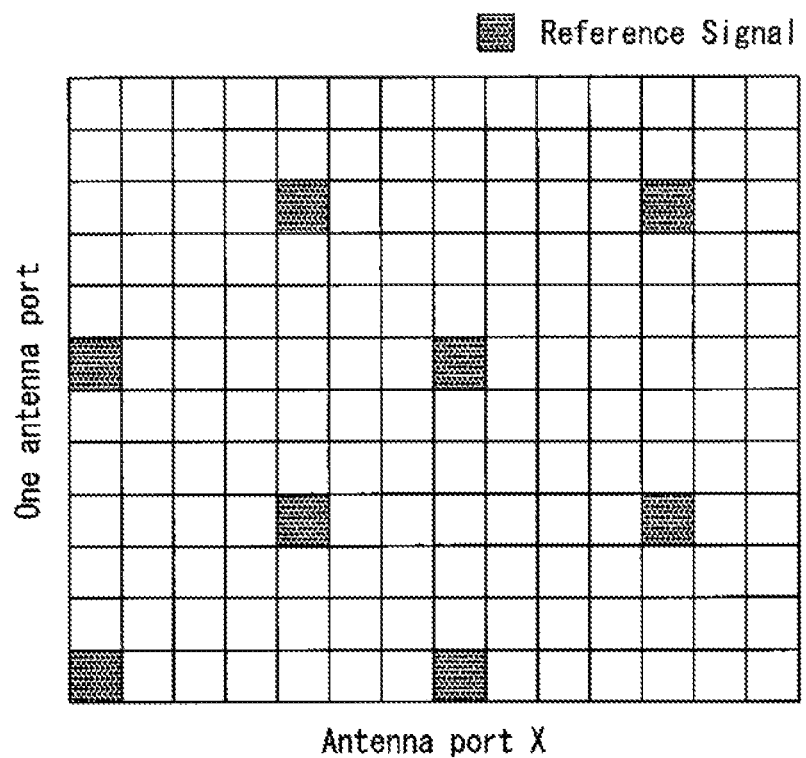
FIG. 8 is a schematic diagram illustrating an example of reference signals transmitted with a first subcarrier spacing mapped by a base station apparatus according to the first embodiment of the present invention.

FIG. 8 is a schematic diagram illustrating an example of reference signals transmitted with the first subcarrier spacing mapped by the base station apparatus 3 according to the first embodiment of the present invention.

Figure 9:
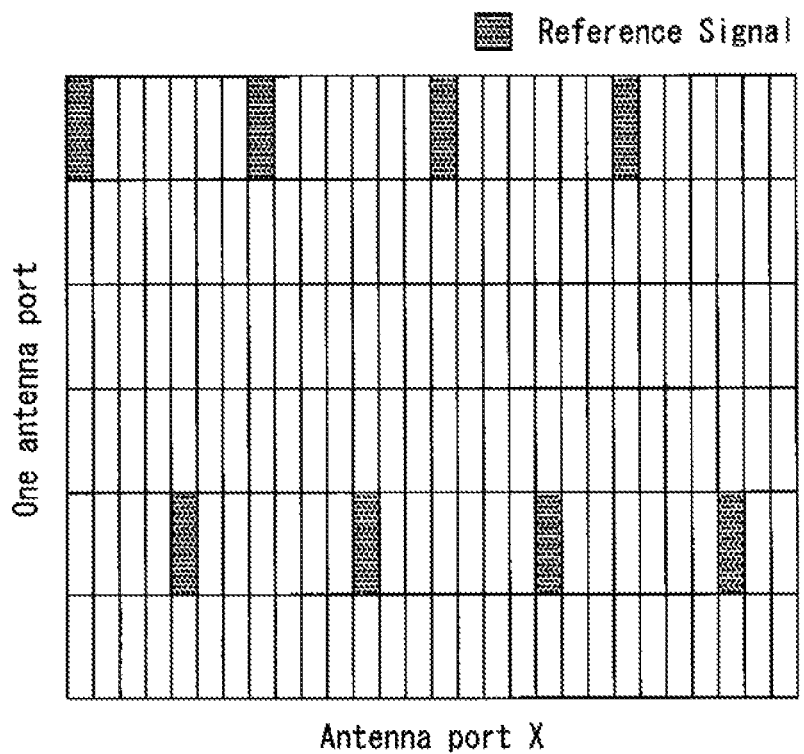
FIG. 9 is a schematic diagram illustrating an example of reference signals transmitted with a second subcarrier spacing mapped by the base station apparatus according to the first embodiment of the present invention.

FIG. 9 is a schematic diagram illustrating an example of reference signals transmitted with the second subcarrier spacing mapped by the base station apparatus 3 according to the first embodiment of the present invention.

Figure 10:
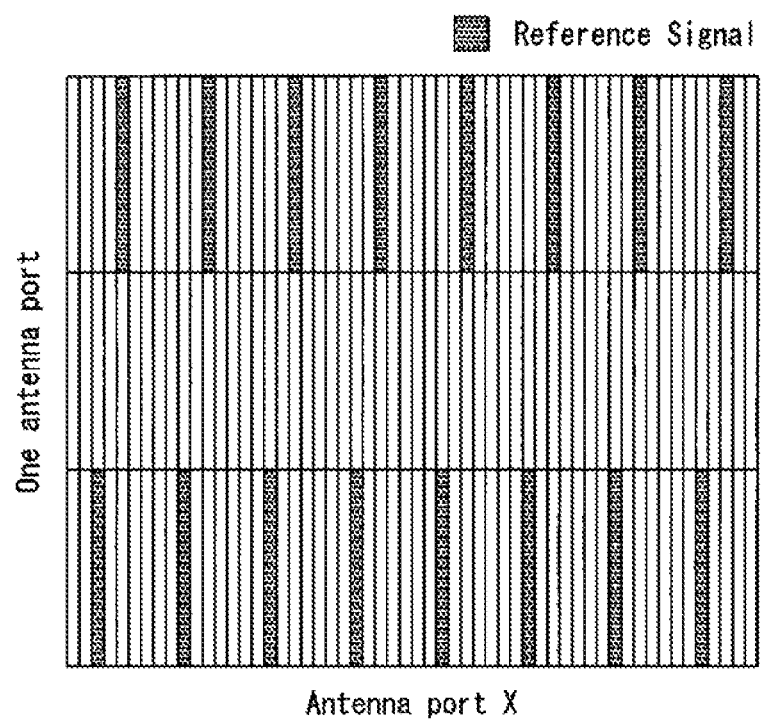
FIG. 10 is a schematic diagram illustrating an example of reference signals transmitted with a third subcarrier spacing mapped by the base station apparatus according to the first embodiment of the present invention.

FIG. 10 is a schematic diagram illustrating an example of reference signals transmitted with the third subcarrier spacing mapped by the base station apparatus 3 according to the first embodiment of the present invention.

Specifically, the example illustrated in FIG. 8 is an example of the mapping of the reference signal for the subcarrier spacing of 15 KHz, and the example illustrated in FIG. 9 is an example of the mapping of the reference signal for the subcarrier spacing of 30 KHz, and the example illustrated in FIG. 10 is an example of the mapping of the reference signal for the subcarrier spacing of 60 KHz.

The examples illustrated in FIGS. 8, 9, and 10 show pairs of two resource blocks (RB) in one subframe. One resource block is constituted by a predetermined number of subcarriers in the frequency direction and a predetermined number of OFDM symbols in the time direction. Of each OFDM symbol, each subcarrier is called a resource element (RE).

Here, the number of resource blocks can be changed according to the frequency bandwidth (system bandwidth) used by the communication system. For example, a prescribed number of resource blocks can be used, which is also referred to as a component carrier (Carrier Component: CC) as one unit.

For example, a reference signal is mapped to a resource element indicated by black in the drawing. Here, the illustrated example is an example of the case of one antenna port, but the number may be changed. For example, it is possible to map reference signals for two antenna ports, or for four antenna ports. Also, the illustrated example is an example of the case in which the number of antenna port is X, but the CRS can be configured for a prescribed number of antenna ports (antenna ports 0 to X).

Note that the data signal and the control signal are mapped to white-filled resource elements in the figure. Other reference signals such as CSI-RS and DMRS may be mapped.

Note that, in FIGS. 8, 9, and 10, the reference signals (RS) are arranged in the scattered configuration in the time-domain and/or the frequency domain, but the reference signal (RS) may be arranged in all the subcarriers of a specific OFDM symbol. For example, only the A symbol at the head of the subframe (A is an integer greater than 1) may be the reference signal (RS) symbol.

Next, configuration of the terminal apparatus 1 and the base station apparatus 3 according to the first embodiment of the present invention will be described below.

Figure 11:
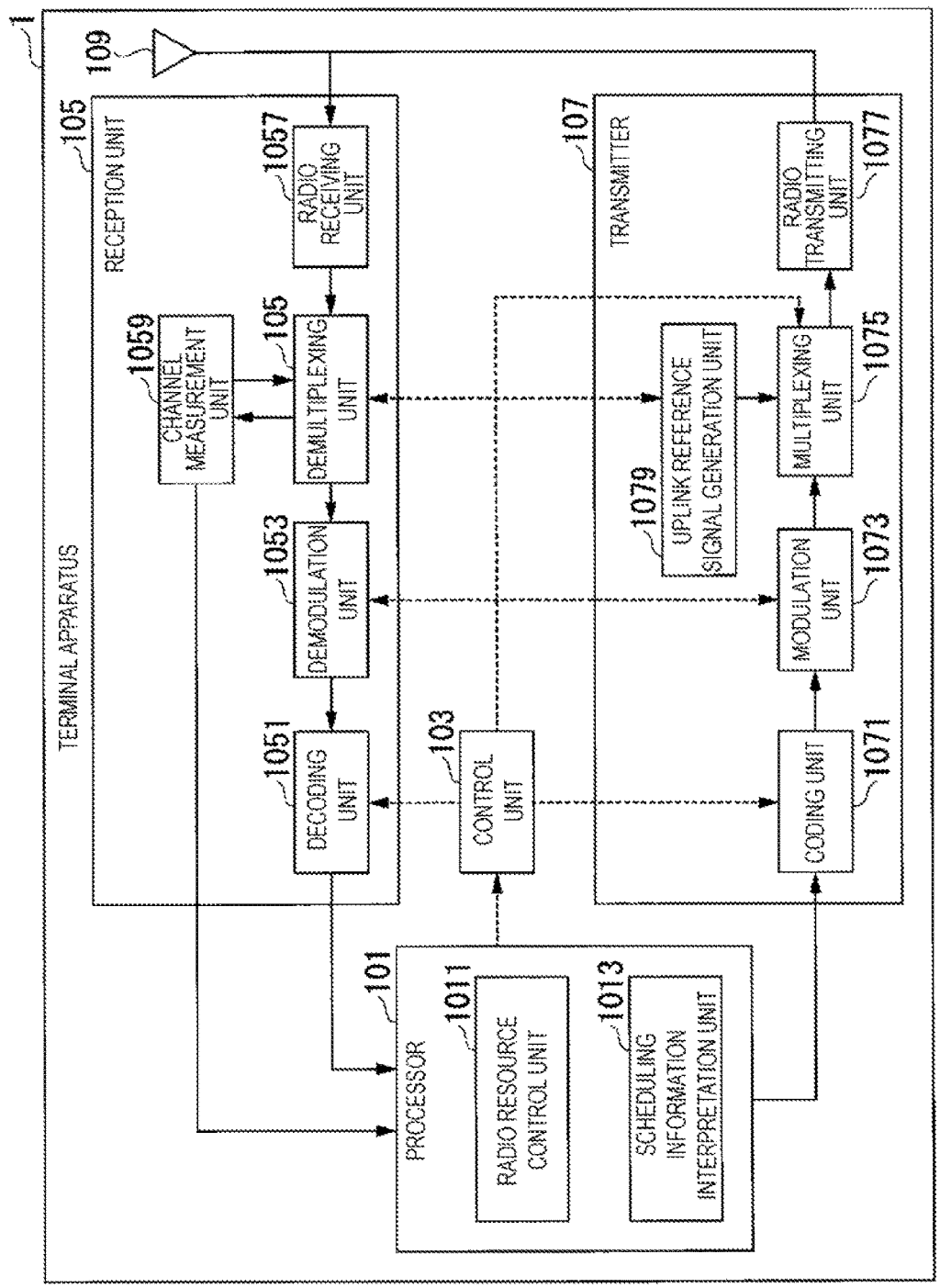
FIG. 11 is a schematic block diagram illustrating an example of a configuration of the terminal apparatus according to the first embodiment of the present invention.

FIG. 11 is a schematic block diagram illustrating an example of a terminal apparatus 1 according to the first embodiment of the present invention.

The terminal apparatus 1 is configured including a processor 101, a controller 103, a receiver 105, a transmitter 107, and a transmit and receive antenna 109. The processor 101 is configured including a radio resource control unit 1011, and a scheduling information interpretation unit 1013. The receiver 105 is configured including a decoding unit 1051, a demodulation unit 1053, a demultiplexing unit 1055, a radio receiving unit 1057, and a channel measurement unit 1059. The transmitter 107 is configured including a coding unit 1071, a modulation unit 1073, a multiplexing unit 1075, a radio transmitting unit 1077, and an uplink reference signal generation unit 1079.

It is to be noted that each functional unit of the terminal apparatus 1 may be realized by one or more integrated circuits or may be realized by software.

The processor 101 outputs the uplink data (the transport block) generated by a user operation or the like, to the transmitter 107. In addition, the processor 101 performs processing of the Medium Access Control (MAC), the Packet Data Convergence Protocol (PDCP) layer, the Radio Link Control (RLC) layer, and the Radio Resource Control (RRC) layer, and the like.

The radio resource control unit 1011 included in the processor 101 manages various configuration information/parameters of the terminal apparatus 1 itself. The radio resource control unit 1011 sets the various configuration information/parameters in accordance with higher layer signals received from the base station apparatus 3. In other words, the radio resource control unit 1011 sets the various configuration information/parameters in accordance with the information indicating the various configuration information parameters received from the base station apparatus 3. Furthermore, the radio resource control unit 1011 generates information to be mapped to each uplink channel, and outputs the generated information to the transmitter 107. The radio resource control unit 1011 is also referred to as a setting unit 1011.

Here, the scheduling information interpretation unit 1013 included in the processor 101 interprets (analyzes) the DCI format (the scheduling information, the UL grant) received through the receiver 105, generates control information for control of the receiver 105 and the transmitter 107, in accordance with a result of interpreting (analyzing) the DCI format, and performs output to the controller 103.

In accordance with the control information from the processor 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the resulting information resulting from the decoding, to the processing unit 101.

The radio receiving unit 1057 converts (down converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally demodulated analog signal into a digital signal. The radio receiving unit 1057 removes a portion corresponding to a Cyclic Prefix (CP) from the resulting digital signal resulting from the conversion, performs Fast Fourier Transform (FFT) on the resulting signal from the CP removal, and extracts a signal in the frequency domain. Details of the processing performed in the radio receiving unit 1057 will be described later.

The demultiplexing unit 1055 demultiplexes the extracted signal into the PHICH, the PDCCH, the PDSCH, and the downlink reference signal, respectively. Moreover, the demultiplexing unit 1055 makes a compensation of channels of the PHICH, the PDCCH, and the PDSCH, from a channel estimate input from the channel measurement unit 1059. Furthermore, the demultiplexing unit 1055 outputs the resulting downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and performs output to the decoding unit 1051. The decoding unit 1051 decodes the PHICH destined for the terminal apparatus 1 itself and outputs the resulting HARQ indicator from the decoding to the processor 101. The demodulation unit 1053 demodulates the PDCCH in compliance with a QPSK modulation scheme and performs output to the decoding unit 1051. The decoding unit 1051 attempts to decode the PDCCH and in case of succeeding in the decoding, the decoding unit 1051 outputs the resulting downlink control information from the decoding and an RNTI to which the downlink control information corresponds, to the processor 101.

The demodulation unit 1053 demodulates the PDSCH in compliance with a modulation scheme notified with the downlink grant, such as Quadrature Phase Shift Keying (QPSK), Quadrature Amplitude Modulation (16QAM), or 64QAM, and performs output to the decoding unit 1051. The decoding unit 1051 decodes the data in accordance with information on a coding rate notified with the downlink control information, and outputs, to the processor 101, the downlink data (the transport block)resulting, from the decoding.

The channel measurement unit 1059 measures a downlink path loss or a channel state from the downlink reference signal input from the demultiplexing unit 1055, and outputs the measured path loss or channel state to the processor 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmitter 107 generates the uplink reference signal in accordance with the control signal input from the controller 103, codes and/or modulates the uplink data (the transport block) input from the processor 101, multiplexes the PUCCH, the PUSCH, and/or the generated uplink reference signal, and performs transmission to the base station apparatus 3 through the transmit and receive antenna 109. Furthermore, the transmitter 107 transmits uplink control information.

In addition, the coding unit 1071 performs coding, such as convolutional coding or block coding, on the uplink control information input from the processor 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16QAM, or 64QAM, and/or in compliance with a modulation scheme predetermined in advance for each channel. In accordance with the information used for the scheduling of the PUSCH, the modulation unit 1073 determines the number of data sequences to be spatially multiplexed, maps multiple pieces of uplink data to be transmitted on the same PUSCH to multiple sequences through Multiple Input Multiple Output (MIMO) and Spatial Multiplexing (SM), and performs precoding on the sequences.

The uplink reference signal generation unit 1079 generates a sequence obtainable in accordance with a rule (formula) predetermined in advance, based on a physical layer cell identifier (also referred to as a Physical Layer Cell Identity (PCI), a Cell ID, or the like) for identifying the base station apparatus 3, a bandwidth in which the uplink reference signal is arranged, a cyclic shift notified with the uplink grant, a parameter value for generation of a DMRS sequence, and the like. In accordance with the control signal input from the controller 103, the multiplexing unit 1075 performs Discrete Fourier Transform (DFT) after rearranging modulation symbols of the PUSCH in parallel. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, performs up-conversion into a signal of a carrier frequency, performs power amplification, and performs output to the transmit and receive antenna 109 for transmission.

Figure 12:
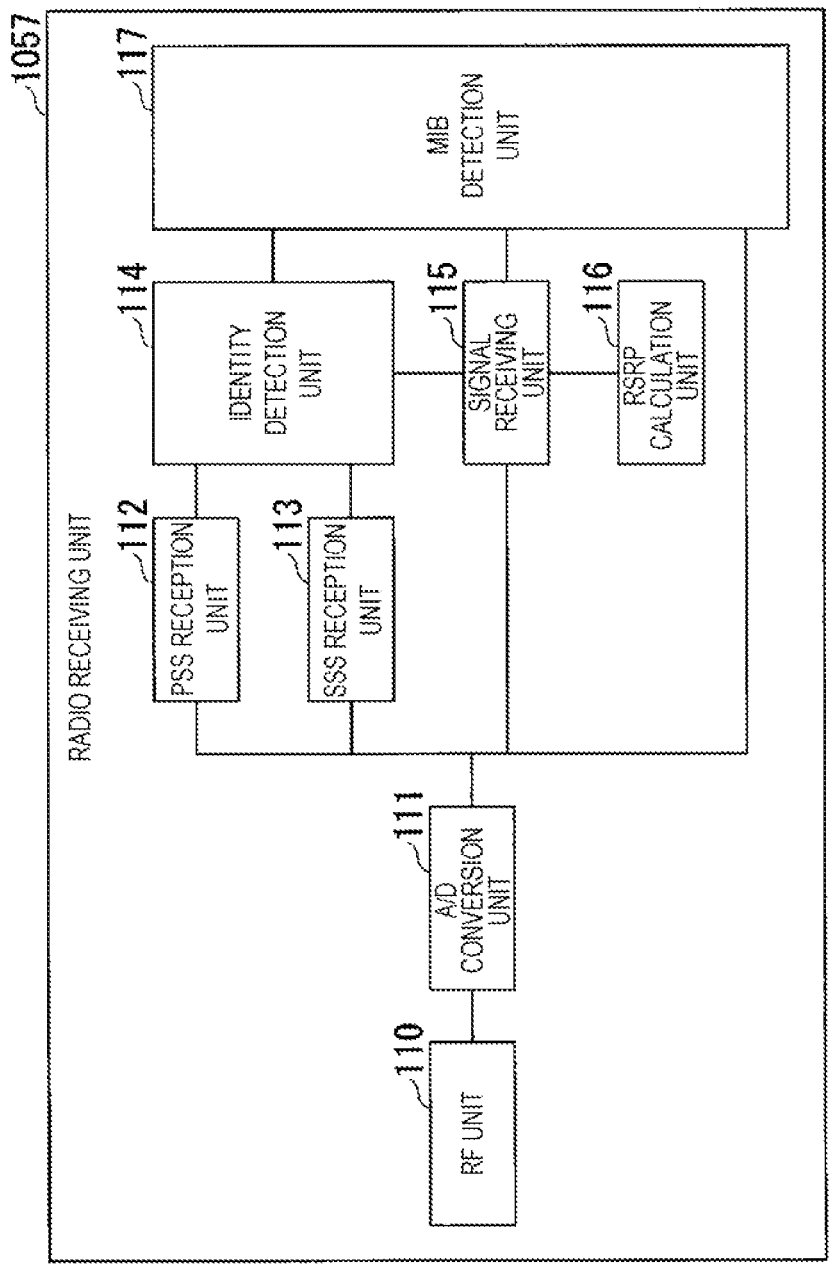
FIG. 12 is a schematic block diagram illustrating an example of a configuration of a radio receiving unit of the terminal apparatus according to the first embodiment of the present invention.

FIG. 12 is a schematic block diagram illustrating an example of a configuration of a radio receiving unit 1057 of a terminal apparatus 1 according to the first embodiment of the present invention.

The radio receiving unit 1057 includes an RF (Radio Frequency) unit 110, an A/D (Analog to Digital) conversion unit 111, a PSS reception unit 112, an SSS reception unit 113, an identity detection unit 114, a reference signal receiving unit 115, an RSRP (Reference Signal Received Power) calculation unit 116, and an MIB detection unit 117.

The RF unit 110 converts (down-converts) a signal received via the transmit and receive antenna 109 into a baseband signal by orthogonal demodulation, and removes unnecessary frequency components. The RF unit 110 outputs the analog signal subjected to the process of removing unnecessary frequency components to the A/D conversion unit 111.

The A/D conversion unit 111 converts the analog signal input from the RF unit 110 into a digital signal. The A/D conversion unit 111 removes a portion corresponding to a Cyclic Prefix (CP) from the digital signal resulting from the conversion, performs Fast Fourier Transform (FFT) on the resulting signal from the CP removal, and extracts a signal in the frequency domain. The A/D conversion unit 111 outputs the extracted signal in the frequency domain to the PSS reception unit 112, the SSS reception unit 113, the reference signal receiving unit 115, the RSRP calculation unit 116, and the MIB detection unit 117.

The PSS reception unit 112 (also referred to as the first reception unit and the first synchronization signal reception unit) searches (performs a cell (beam) search for) a connectable cell (beam) of the base station apparatus 3, as an initial access. Each cell (beam) is specified by identity (physical cell ID, beam ID, and the like). The PSS reception unit 112 detects a primary synchronization signal (PSS first synchronization signal) transmitted from the base station apparatus 3 in a prescribed cycle from the frequency domain signal input from the A/D conversion unit 111. The PSS reception unit 112 outputs the detected primary synchronization signal (PSS, first synchronization signal) to the identity detection unit 114.

The SSS reception unit 113 (also referred to as the second reception unit and the second synchronization signal reception unit) detects a secondary synchronization signal (SSS, second synchronization signal) transmitted from the base station apparatus 3 in a prescribed cycle, from signal in the frequency domain input from the A/D conversion unit 111. The SSS reception unit 113 outputs the detected secondary synchronization signal (SSS, second synchronization signal) to the identity detection unit 114.

The identity detection unit 114 (also referred to as an identity detection unit or detection unit) may identify determine, detect) the identity (a physical cell ID, a beam ID, and the like) according to a primary synchronization signal (PSS) to be transmitted by the base station apparatus 3 in a prescribed cycle detected by the PSS reception unit 112. In addition, the identity detection unit 114 may identify (determine, detect) the identity (the physical cell ID, the beam ID, and the like) according to a secondary synchronization signal (SSS) to be transmitted by the base station apparatus 3 in a prescribed cycle detected by the SSS reception unit 113.

Further, the identity detection unit 114 may obtain information related to the identity (the physical cell ID, the beam ID) and output the information related to the obtained identity to the SSS reception unit 113, by the PSS reception unit 112 detecting the primary synchronization signal (PSS). In this case, the SSS reception unit 113 can detect the secondary synchronization signal (SSS) according to the information related to the identity.

In addition, the identity detection unit 114 may identify (determine, detect) the identity (the physical cell ID, the beam ID, and the like) by detecting the primary synchronization signal (PSS) and the secondary synchronization signal (SSS). In this case, unless the information related to the identity (the physical cell ID, the beam ID) can be obtained, the secondary synchronization signal (SSS) cannot be correctly detected.

Namely, the identity detection unit 114 may identify (determine, detect) the identity (the physical cell ID, the beam ID, and the like) by the PSS reception unit 112 and/or the SSS reception unit 113 detecting one or both of the primary synchronization signal (PSS) and/or the secondary synchronization signal (SSS) from the signal in the frequency domain by the cell (beam) search.

The identity detection unit 114 outputs the identified (determined, detected) identity (physical cell ID, beam ID, and the like) to the reference signal receiving unit 115 and the MIB detection unit 117.

The MIB detection unit 117 receives (detects) the system information block (MIB) by the identity detection unit 114 identifying (determining, detecting) the identity (the physical cell ID, the beam ID), based on the identified (determined, detected) identity via the physical broadcast information channel (PBCH). Note that the MIB detection unit 117 may receive (detect) the system information block (MIB) based on the reference signal received by the reference signal receiving unit 115.

Also, the reference signal receiving unit 115 receives the reference signal. The reference signal is mapped to the resource element along with the system information block (MIB). For example, the reference signal receiving unit 115 may receive a reference signal arranged in a resource element predetermined for a subcarrier spacing of 15 kHz, may receive a reference signal arranged in a resource element predetermined for as subcarrier spacing of 30 kHz, or may receive a reference signal arranged in a resource element predetermined for a subcarrier spacing of 60 kHz. Note that, in the present embodiment, for the convenience of description, there are cases in which the reference signal received by the reference signal receiving unit 115 is distinguished as the first reference signal, the second reference signal, and the third reference signal.

The RSRP calculation unit 116 may calculate (measure) the reference signal reception power (RSRP) from the reference signal received by the reference signal receiving unit 115. Also, the reference signal reception power (RSRP) is defined by the linear average power of the resource elements in which the reference signal within the considered frequency hand is arranged. The considered frequency band may be instructed by the base station apparatus 3 or may be instructed by an higher layer. Further, it may be guaranteed that the reference signal for calculating (measuring) the reference signal reception power (RSRP) is arranged in the considered frequency band. In the case in which instructed by the higher layer based on the detection of the reference signal, the RSRP calculation unit 116 may calculate (measure) the reference signal reception power (RSRP) in the subframe in which the reference signal is detected. In addition, in a case that a presence of the reference signal can be detected in other subframes, the RSRP calculation unit 116 may calculate (measure) the reference signal reception power (RSRP) using these subframes.

Note that, the RSRP calculation unit 116 may calculate (measure) the reference signal reception power (RSRP) based on the reference signal arranged in the resource element of each subcarrier spacing. In addition, the RSRP calculation unit 116 may transmit (report) the calculated reference signal reception power (RSRP) to the base station apparatus 3 via the transmitter 107, or transmit (report) to the base station apparatus 3 via the channel measurement unit 1059 and the processor 101.

Figure 13:
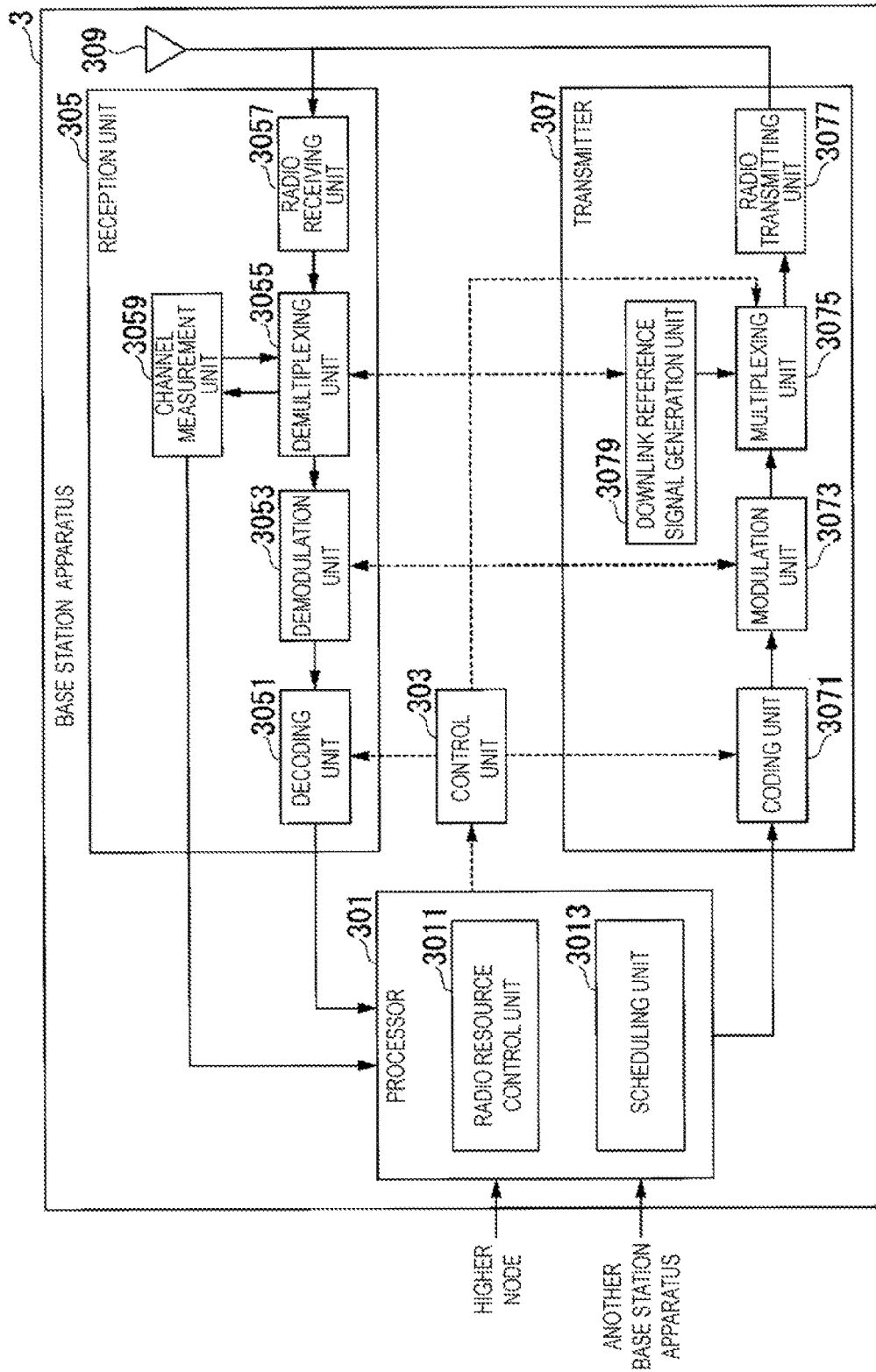
FIG. 13 is a schematic block diagram illustrating an example of a configuration of the base station apparatus according to the first embodiment of the present invention.

FIG. 13 is a schematic block diagram illustrating an example of a configuration of a base station apparatus 3 according to the first embodiment of the present invention.

The base station apparatus 3 is configured including a processor 301 a controller 303, a receiver 305, a transmitter 307, and a transmit and receive antenna 309. In addition, the processor 301 is configured including a radio resource control unit 3011, and a scheduling unit 3013. In addition, the receiver 305 is configured including a decoding unit 3051, a demodulation unit 3053, a demultiplexing unit 3055, a radio receiving, unit 3057, and a channel measurement unit 3059, in addition, the transmitter 307 is configured including a coding unit 3071, a modulation unit 3073, a multiplexing unit 3075, a radio transmitting unit 3077, and a downlink reference signal generation unit 3079.

It should be noted that each functional unit of the base station apparatus 3 may be configured to be realized by one or more integrated circuits or may be realized by software.

The processor 301 performs processing of the Medium Access Control (MAC) layer, the Packet Data Convergence Protocol (PDCP) layer, the Radio Link Control (RLC) layer, and the Radio Resource Control (RRC) layer. Furthermore, the processor 301 generates control information for control of the receiver 305 and the transmitter 307, and performs output to the controller 303.

In addition, the radio resource control unit 3011 included in the processor 301 generates, or obtains from a higher node, the downlink data (the transport block) arranged to the downlink PDSCH, system information, the RRC message, the MAC Control Element (CE), and the like, and outputs a result of the generation or the acquirement to the transmitter 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signals. In other words, the radio resource control unit 1011 transmits/broadcasts information indicating various configuration information/parameters. The radio resource control unit 3011 is also referred to as a setting unit 3011.

The scheduling unit 3013 included in the processor 301 determines a frequency and/or a subframe to which the physical channels (the PDSCH and/or the PUSCH) are allocated, the coding rate and/or modulation scheme for the physical channels (the PDSCH and/or the PUSCH), and/or the transmit power, and the like, from the received channel state information and/or from the channel estimate, channel quality, or the like input from the channel measurement unit 3059. The scheduling unit 3013 generates the control information (for example, the DCI format) in order to control the receiver 305 and/or the transmitter 307 in accordance with a result of the scheduling, and performs output to the controller 303. The scheduling unit 3013 further determines timing of performing transmission processing and/or reception processing.

In accordance with the control information from the processor 301, the controller 303 generates a control signal for control of the receiver 305 and the transmitter 307. The controller 303 outputs the generated control signal to the receiver 305 and/or the transmitter 307 to control the receiver 305 and/or the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the processor 301. The radio receiving unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The receiver 305 receives the uplink control information.

The radio receiving unit 3057 removes a portion corresponding to a Cyclic Prefix (CP) from the digital signal resulting from the conversion. The radio receiving unit 3057 performs Fast Fourier Transform (FFT) on the resulting signal from the removal, extracts a signal in the frequency domain, and outputs the resulting signal to the demultiplexing unit 3055.

The demultiplexing unit 1055 demultiplexes the signal input from the radio receiving unit 3057 into the signals, such as the PUCCH, the PUSCH, and the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing, unit 3055 outputs an uplink reference signal resulting from the demultiplexing, to the channel measurement unit 3059.

The demodulation unit 3053 performs Inverse Discrete Fourier Transform (IDFT) on the PUSCH, obtains modulation symbols, and performs reception signal demodulation, namely, demodulates each of the modulation symbols on the PUCCH and the PUSCH, in compliance with the modulation scheme predetermined in advance, such as Binary Phase Shift Keying (BPSK), QPSK, 16QAM, or 64QAM, or in compliance with the modulation scheme that the base station apparatus 3 itself notified in advance with the uplink grant to each of the terminal apparatuses 1. The demodulation unit 3053 demultiplexes the modulation symbols of multiple pieces of uplink data transmitted on the same PUSCH with the MIMO SM, based on the number of spatially multiplexed sequences notified in advance with the uplink grant to each of the terminal apparatuses 1 and information designating the precoding to be performed on the sequences.

The decoding unit 3051 decodes the coded bits of the PUCCH and the PUSCH, which have been demodulated, at the coding rate in compliance with a coding, scheme prescribed in advance, the coding rate being prescribed in advance or being notified in advance with the uplink grant to the terminal apparatus 1 by the base station apparatus 3 itself, and outputs the decoded uplink data and uplink control information to the processor 101. In a case in which the PUSCH is re-transmitted, the decoding unit 3051 performs the decoding with the coded bits input from the processor 301 and retained in an HARQ buffer, and the demodulated coded bits. The channel measurement unit 3059 measures the channel estimate, the channel quality, and the like, based on the uplink reference signal input from the demultiplexing unit 3055, and outputs a result of the measurement to the demultiplexing unit 3055 and/or the processor 301.

The transmitter 307 generates the downlink reference signal in accordance with the control signal input from the controller 303, codes and modulates the HARQ indicator, the downlink control information, and the downlink data that are input from the processor 301, multiplexes the PHICH, the PDCCH, the PDSCH, and/or the downlink reference signal, and transmits the signal to the terminal apparatus 1 through the transmit and receive antenna 309.

The coding unit 3071 codes the HARQ indicator, the downlink control information, and/or the downlink data that are input from the processor 301, in compliance with the coding scheme predetermined in advance, such as block coding, convolutional coding, or turbo coding, and/or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16QAM, or 64QAM, and/or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

In addition, the radio transmitting unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

Figure 14:
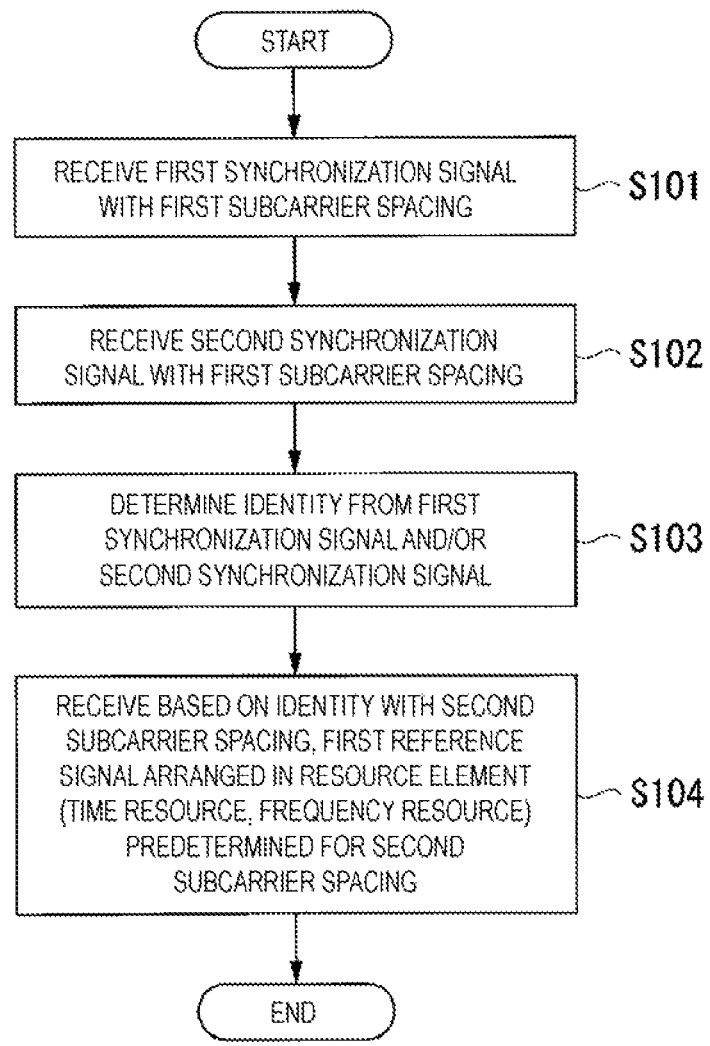
FIG. 14 is a flowchart illustrating an example of an initial access procedure between the base station apparatus and the terminal apparatus according to the first embodiment of the present invention.

FIG. 14 is a flowchart illustrating an example of an initial access procedure between the base station apparatus 3 and the terminal apparatus 1 according to the first embodiment of the present invention.

In step S101, the terminal apparatus 1 searches (performs a cell (beam search of) a connectable cell (beam) of the base station apparatus 3, as an initial access. The terminal apparatus 1 receives (detects) a primary synchronization signal (PSS, first synchronization signal) transmitted by the base station apparatus 3 in a prescribed cycle.

In step S102, the terminal apparatus 1 receives (detects) a secondary synchronization signal (SSS, second synchronization signal) transmitted by the base station apparatus 3 in a prescribed cycle.

In step S103, the terminal apparatus 1 determines (identifies, detects) the identity (the physical cell ID, the beam ID, and the like) from the received (detected) first synchronization signal (PSS) and the second synchronization signal (SSS).

In step S103, the terminal apparatus 1 may obtain information related to the identity (the physical cell ID, the beam ID) by detecting the primary synchronization signal (PSS), and in step S102, detecting the secondary synchronization signal (SSS), may specify (determine, detect, identify) the identity (the physical cell ID, the beam ID, and the like) in step S103. In this case, unless the information related to the identity (the physical cell ID, the beam ID) can be obtained, the secondary synchronization signal (SSS) cannot be correctly detected.

It is to be noted that in step S103, the terminal apparatus 1 may identify (determine, detect) the identity (the physical cell ID, the beam ID, and the like) without executing step S102 based on the first synchronization signal by detecting the primary synchronization signal (PSS) transmitted by the base station apparatus 3 in a prescribed cycle in step S101.

It is to be noted that in step S103, the terminal apparatus 1 may identify (determine, detect) the identity (the physical cell ID, the beam ID, and the like) based on the second synchronization signal without executing step S101 by detecting the secondary synchronization signal (SSS) transmitted by the base station apparatus 3 in a prescribed cycle in step S102.

Namely, in step S103, the terminal apparatus 1 may identify (determine, detect, identify) the identity (the physical cell ID, the beam ID, and the like) by detecting one or both of the primary synchronization signal (PSS) and the secondary synchronization signal (SSS) by cell (beam) search.

In step S104, the terminal apparatus 1 receives the first reference signal with the second subcarrier spacing (for example, subcarrier spacing of 30 kHz) based on the, determined (identified, detected) identity. This first reference signal is allocated to resource elements predetermined for a second subcarrier spacing (for example, a subcarrier spacing of 30 kHz). Resource elements are time resources and/or frequency resources.

As described above, the terminal apparatus 1 according to the first embodiment includes a first reception unit (PSS reception unit 112) configured to receive a first synchronization signal (PSS) with a first subcarrier spacing (for example, a subcarrier spacing of 15 kHz); a second reception unit (SSS reception unit 113) configured to receive a second synchronization signal (SSS) with the first subcarrier spacing (for example, a subcarrier spacing of 15 kHz); a detection unit (identity detection unit 114) configured to detect an identity from the first synchronization signal an &or the second synchronization signal; and a third reception unit configured to receive a first reference signal with the second subcarrier spacing (for example, a subcarrier spacing of 30 kHz) different from the first subcarrier spacing (reference signal receiving unit 115), wherein, the first reference signal is arranged in a time resource and/or a frequency resource predetermined for the second subcarrier spacing.

According to such a configuration, even in a case that communication is performed using subcarriers having different subcarrier spacings, the terminal apparatus 1 and the base station apparatus 3 can perform communication efficiently.

Second Embodiment

In the second embodiment, a case where the terminal apparatus 1 demodulates (decodes) the system information block (MIB) based on the reference signal, and/or a case where the terminal apparatus 1 calculates (measures) the reference signal reception power based on the reference signal a case in which and the signal reception power is reported (transmitted) to the base station apparatus 3, will be described.

Since the configuration of the terminal apparatus 1 and the configuration of the base station apparatus 3 are the same as those of the first embodiment, respectively, the description and illustration thereof are omitted. In the second embodiment, the description will focus mainly on portions different from the first embodiment.

Figure 15:
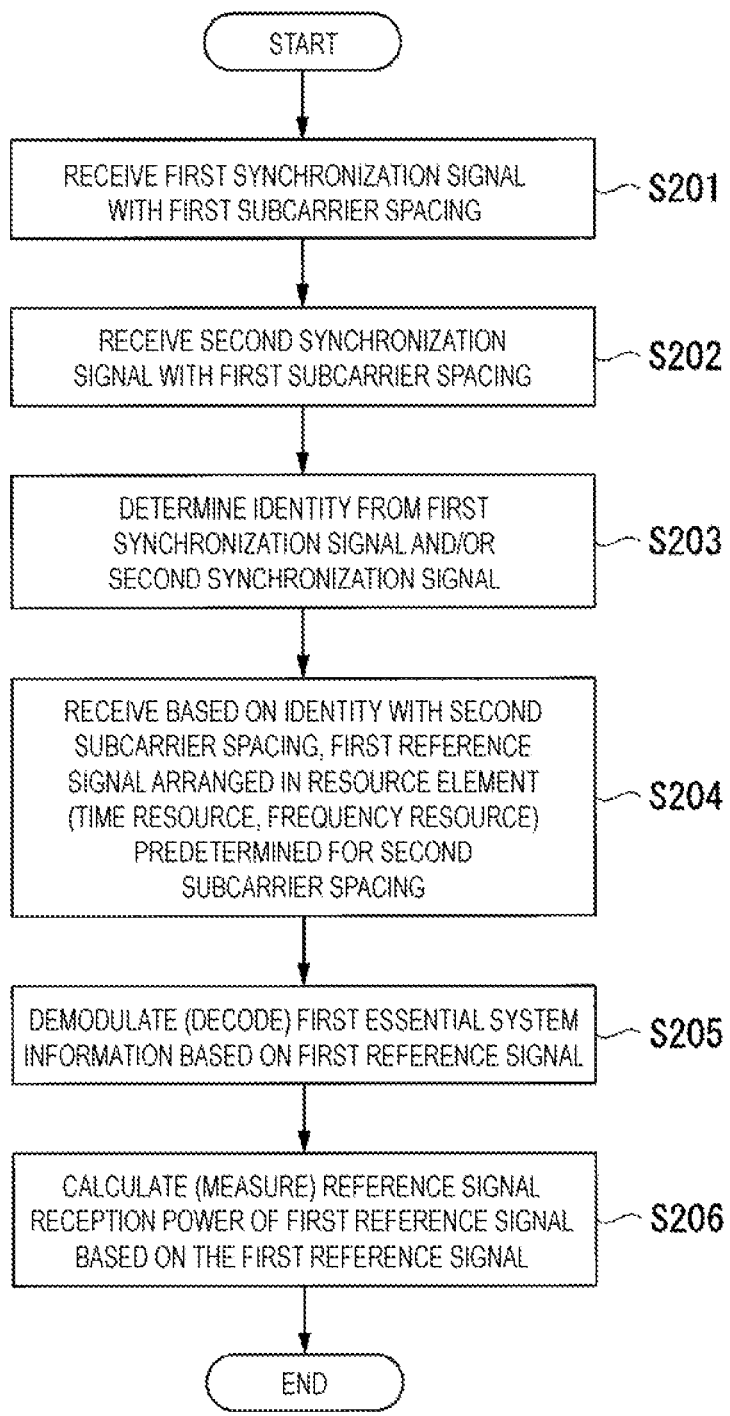
FIG. 15 is a flowchart illustrating an example of an initial access procedure between the base station apparatus and the terminal apparatus according to the second embodiment of the present invention.

FIG. 15 is a flowchart illustrating an example of an initial access procedure between the base station apparatus 3 and the terminal apparatus 1 according to the second embodiment of the present invention.

In step S201, the terminal apparatus 1 searches (performs a cell (beam) search of) a connectable cell (beam) of the base station apparatus 3, as an initial access. The terminal apparatus 1 receives (detects) a primary synchronization signal (PSS, first synchronization signal) transmitted by the base station apparatus 3 in a prescribed cycle.

In step S202, the terminal apparatus 1 receives (detects) a secondary synchronization signal (SSS, second synchronization signal) transmitted by the base station apparatus 3 in a prescribed cycle.

In step S203, the terminal apparatus 1 determines (identifies, detects) the identity (the physical cell ID, the beam ID, and the like) from the received (detected) first synchronization signal (PSS) and the second synchronization signal (SSS).

In step S203, the terminal apparatus 1 may obtain information related to the identity (the physical cell ID, the beam ID) by detecting the primary synchronization signal (PSS), and in step S202, the secondary synchronization signal (SSS) and may identify (determine, detect) the identity (the physical cell ID, the beam ID, and the like) in step S203. In this case, unless the information related to the identity (the physical cell ID, the beam ID) can be obtained, the secondary synchronization signal (SSS) cannot be correctly detected.

It is to be noted that in step S203, the terminal apparatus 1 may identify (determine, detect) the identity (the physical cell ID, the beam ID, and the like) based on the first synchronization signal without executing step S102 by detecting the primary synchronization signal (PSS) transmitted by the base station apparatus 3 in a prescribed cycle in step S201.

It is to be noted that in step S203, the terminal apparatus 1 may identify (determine, detect) the identity (the physical cell ID, the beam ID, and the like) based on the second synchronization signal without executing step S201 by detecting the secondary synchronization signal (SSS) transmitted by the base station apparatus 3 in a prescribed cycle in step S202.

Namely, in step S203, the terminal apparatus 1 may identify (determines, detects) the identity (the physical cell ID, the beam ID, and the like) by detecting one or both of the primary synchronization signal (PSS, first synchronization signal) and the secondary synchronization signal (SSS, second synchronization signal) by cell (beam) search.

In step S204, the terminal apparatus 1 receives the first reference signal with the second subcarrier spacing (for example, subcarrier spacing of 30 kHz) based on the determined (identified, detected) identity. This first reference signal is allocated to resource elements determined for a second subcarrier spacing (for example, a subcarrier spacing of 30 kHz). Resource elements are time resources and/or frequency resources.

In step S205, the terminal apparatus 1 demodulates (decodes) the first essential system information (the system information block (MIB) of the subcarrier spacing of 30 kHz) based on the first reference signal.

In step S206, the terminal apparatus 1 calculates (measures) the reference signal reception power (RSRP) of the first reference signal based on the first reference signal.

Note that, in step S206, the terminal apparatus 1 may report (transmit) the reference signal reception power (RSRP) of the first reference signal calculated (measured) to the base station apparatus 3.

Note that the terminal apparatus 1 may execute step S206 without executing step S205.

As described above, the terminal apparatus 1 according to the second embodiment includes a first reception unit (PSS reception unit 112) configured to receive a first synchronization signal (PSS) with a first subcarrier spacing (for example, a subcarrier spacing of 15 kHz); a second reception unit (SSS reception unit 113) configured to receive a second synchronization signal (SSS) with the first subcarrier spacing (for example, a subcarrier spacing of 15 kHz); a detection unit (identity detection unit 114) configured to detect an identity from the first synchronization signal and/or the second synchronization signal; and a third reception unit (reference signal receiving unit 115) configured to receive a first reference signal with a second subcarrier spacing (for example, a subcarrier spacing of 30 kHz) different from the first subcarrier spacing, wherein, the first reference signal is arranged in a time resource and/or a frequency resource predetermined for the second subcarrier spacing.

In addition, the terminal apparatus 1 described above may demodulate a first essential system information (MIB) based on the first reference signal.

In addition, the terminal apparatus 1 described above may further include a reference signal power calculation unit (RSRP calculation unit 116) configured to calculate a first reference signal reception power (RSRP) based on the first reference signal.

In addition, the terminal apparatus 1 described above may report the first reference signal reception power to a base station apparatus 3.

Third Embodiment

A third embodiment will be described below. In the present embodiment, in addition to the first synchronization signal (PSS) and the second synchronization signal (SSS), a third synchronization signal (Common Synchronization Signal: CSS) transmitted in a prescribed subcarrier spacing is transmitted. Here, in the above described embodiment, the first synchronization signal (PSS) has been described as having a prescribed subcarrier spacing, but in the present embodiment, the first synchronization signal (PSS) and the second synchronization signal SSS) are transmitted with the same subcarrier spacing as the subcarrier spacing used for data.

Figure 16:
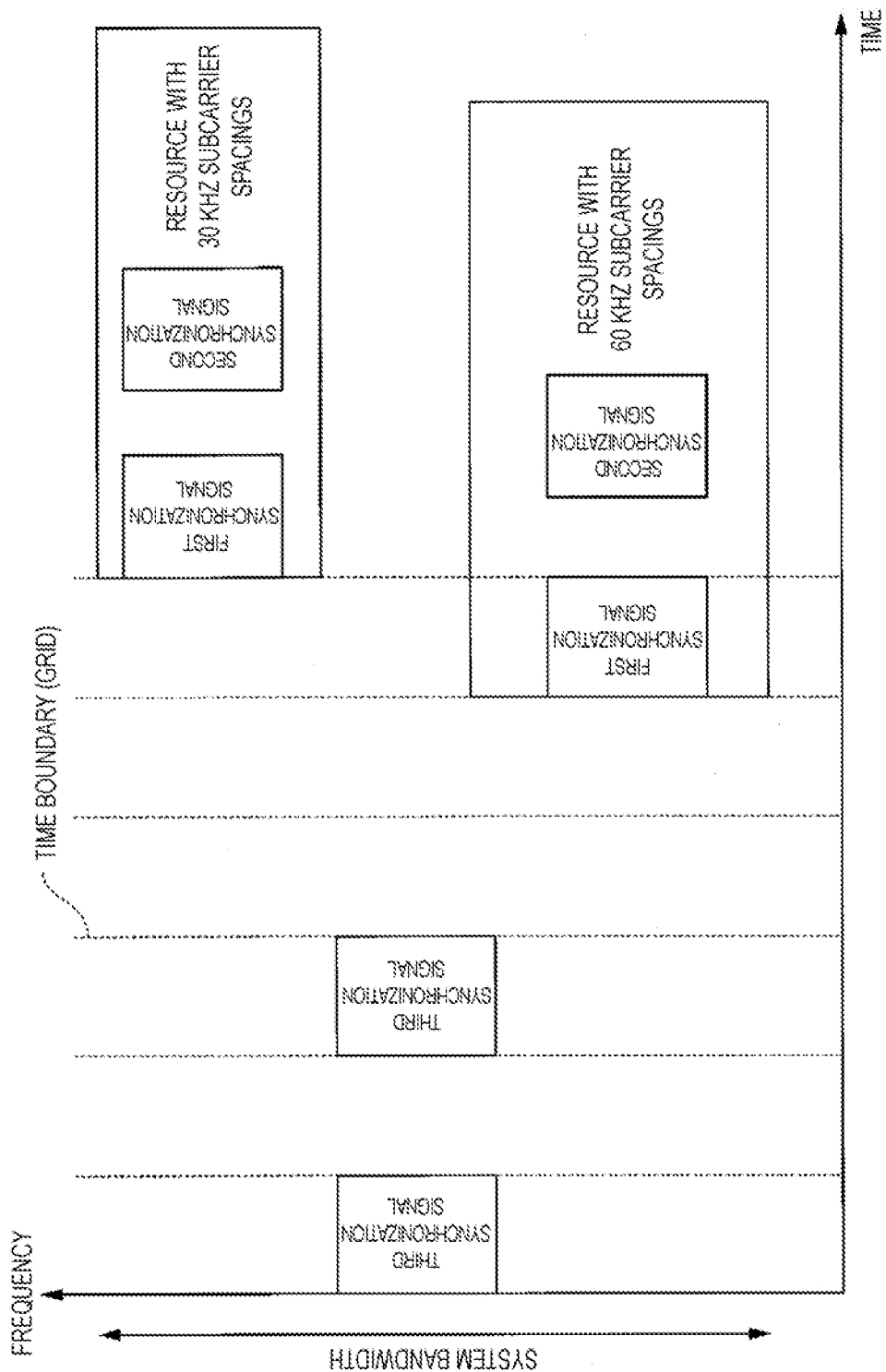
FIG. 16 is a schematic diagram illustrating an example of an initial access procedure between the base station apparatus and the terminal apparatus according to the third embodiment of the present invention.

FIG. 16 is a schematic diagram illustrating an example of an initial access procedure between the base station apparatus 3 and the terminal apparatus 1 according to the third embodiment of the present invention.

The terminal apparatus 1 performs detection of the CSS with (for example, one) subcarrier spacing predetermined in the specification out of the plurality of subcarrier spacings.

The third synchronization signal (CSS) is transmitted by mapping, for example, a Zadoff-Chu sequence onto subcarriers, and the root index of the Zadoff-Chu sequence may be used to give the subcarrier spacing (for example, 30 kHz) used for transmission of the first synchronization signal (PSS).

For example, an index indicating the subcarrier spacing candidate and/or the subcarrier spacing of the first synchronization signal (PSS) such as "15", "30", "15, 30" kHz may be indicated by the root index. Also, a root index of the Zadoff-Chu sequence, a cover code by which to multiply a signal generated using Zadoff-Chu sequence (for example, Hadamard sequence, M sequence, PN sequence, Gold sequence, and the like), and/or cyclic shift index may indicate the subcarrier spacing candidates and/or subcarrier spacings of the first synchronization signal (PSS) such as "15", "30", "15, 30" kHz.

The terminal apparatus 1 recognizes the subcarrier spacing of the first synchronization signal (PSS) from the root index of the third synchronization signal (CSS), and receives the first synchronization signal (PSS) with the recognized subcarrier spacing (for example, 30 kHz).

Further, in a case that there are a plurality of candidates of subcarrier spacings of the first synchronization signal (PSS) from the root index of the third synchronization signal (CSS), the terminal apparatus 1 may perform detection of the first synchronization signal (PSS) with, for example, a narrow or broad subcarrier spacing. Further, the first synchronization signal (PSS) may be detected in accordance with the capability of the terminal apparatus 1. Further, the first synchronization signal (PSS) may be detected with the subcarrier spacing desired by the terminal apparatus 1 (subcarrier spacing corresponding to the service desired by the terminal apparatus 1).

The terminal apparatus 1 detects the second synchronization signal (SSS) based on the reception of the first synchronization signal (PSS). The second synchronization signal (SSS) is received with the same subcarrier spacing as the subcarrier spacing in which the first synchronization signal was received (for example, 30 kHz). At this time, for example, F1, F2, F3, and F6 are identified (executed).

The terminal apparatus 1 detects parameters (for example, the cell ID, the beam ID, and the like) that can decode the essential system information based on the reception of the second synchronization signal (SSS).

Further, the terminal apparatus 1 that can communicate stand-alone does not have to receive the third synchronization signal (CSS).

If the third synchronization signal (CSS) is not received, the subcarrier spacing of the first synchronization signal (PSS) and the second synchronization signal (SSS) may be detected by using blind detection.

Also, the third synchronization signal (CSS) does not need to be transmitted, and the subcarrier spacing between the first synchronization signal (PSS) and/or the second synchronization signal (SSS) with each subcarrier spacing may be detected by using blind detection.

The terminal apparatus 1 may detect the first synchronization signal (PSS), for example, according to the capability of the terminal apparatus 1. Further, the first synchronization signal (PSS) may be detected with the subcarrier spacing desired by the terminal apparatus 1 (subcarrier spacing corresponding to the service desired by the terminal apparatus 1).

Fourth Embodiment

In the fourth embodiment, the third synchronization signal (CSS) is a common synchronization signal (CSS) transmitted with arbitrary subcarrier spacings (for example, 15 kHz, 30 kHz and 60 kHz). An example of a case in which the terminal apparatus detects the third synchronization signal (CSS) in arbitrary subcarrier spacings will be described.

For example, detection of the first synchronization signal (PSS) is performed according to the capability of the terminal apparatus 1. For example, the terminal, apparatus 1 detects the first synchronization signal (PSS) with the subcarrier spacing desired by the terminal apparatus 1 (subcarrier spacing corresponding, to the service desired by the terminal apparatus 1).

A method of generating synchronization signals to be transmitted with each arbitrary subcarrier spacing may be predetermined. Each of the optional subcarrier spacings may be represented as 15 times a power of 2, and/or an integral multiple of 15.

For example, one of the third synchronization signal (CSS) may be present at a predetermined location (for example, subframe number, slot number and/or symbol number) in one or more radio frames (frequency/time resources).

For example, a plurality of third synchronization signals (CSS) may be present at a predetermined location (for example, subframe number, slot number and/or symbol number) in one or more radio frames.

The third synchronization signal (CSS) may be transmitted in only one subcarrier (single tone), for example. Also, the third synchronization signal (CSS) may be used to indicate whether PSS is present. Also, the third synchronization signal (CSS) mar be used to indicate that a second synchronization signal is present in any subcarrier spacing and/or time position (position in one radio frame).

The first synchronization signal (PSS) is a synchronization signal transmitted with a subcarrier spacing (for example, 15 kHz or 30 kHz) with which the base station apparatus 3 operates in an arbitrary band, for example. The terminal apparatus 1 detects the first synchronization signal (PSS).

For example, the terminal apparatus 1 detects the first synchronization signal (PSS) with a subcarrier spacing corresponding to the highest peak power based on the peak power corresponding to each subcarrier spacing.

For example, based on the detection of the third synchronization signal (CSS), the terminal apparatus 1 detects the first synchronization signal (PSS) with subcarrier spacings predetermined by the specification.

For example, a first synchronization signal may be detected by, based on the detection of a third synchronization signal (CSS), detecting in a radio frame which is the same as one or more radio frames used to transmit the third synchronization signal (CSS), at a predetermined position (for example, subframe number, slot number and/or symbol number).

The index and or the subframe of a radio frame in which a first synchronization signal (PSS) is transmitted may be based on an arbitrary subcarrier spacing. In addition, the CSS is given, for example, by the Zadoff-Chu sequence.

If the time position of the first synchronization signal (PSS) is fixed by the specification, F5 is enabled in addition to F3 and F4.

The second synchronization signal (SSS) may be generated in the Zadoff-Chu sequence. At this time, a parameter that can decode essential system information from the root index of the Zadoff-Chu sequence is detected (for example, the cell ID, the beam ID, and the like). Also, the second synchronization signal (SSS) may be generated in other sequences (for example, M sequence, PN sequence, Hadamard sequence, Gold series, and the like), and the identity at this time may be based on the initial value of the shift register and/or, in case of Hadamard sequence, it may be based on the row number. Also, the first synchronization signal (PSS) and the second synchronization signal (SSS) may be transmitted in the same number, or in different number of times in same radio frame. For example, with respect to a second synchronization signal (SSS), F1 and/or F2, and/or F6 are possible.

Fifth Embodiment

In the fifth embodiment, the first synchronization signal (PSS) is a common synchronization signal transmitted with arbitrary subcarrier spacings (for example, 15 kHz, 30 kHz and 60 kHz), and one example where the second synchronization signal (SSS) is transmitted with a subcarrier spacing used for communication by the radio resource will be described.

Figure 17:
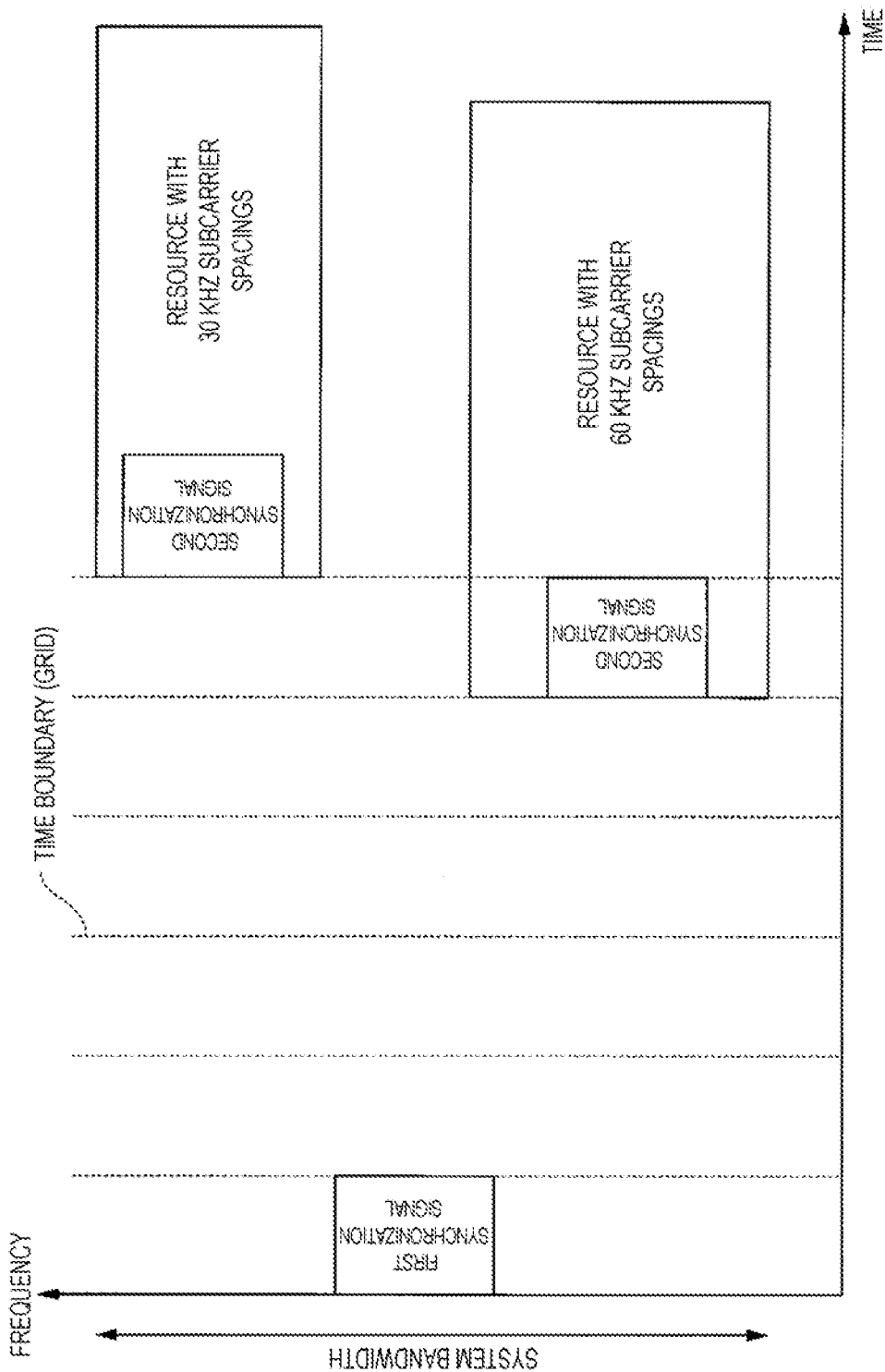
FIG. 17 is a schematic diagram illustrating an example of an initial access procedure between the base station apparatus and the terminal apparatus according to the fifth embodiment of the present invention.

FIG. 17 is a schematic diagram illustrating an example of an initial access procedure between the base station apparatus 3 and the terminal apparatus 1 according to the fifth embodiment of the present invention.

The base station apparatus 3 transmits the first synchronization signal (PSS) in a prescribed cycle with a first subcarrier spacing (for example, a subcarrier spacing of 15 kHz).

In addition, the base station apparatus 3 transmits the second synchronization signal (SSS) in a prescribed cycle and/or time position with a second subcarrier spacing (for example, subcarrier spacing of 30 kHz).

The terminal apparatus 1 performs a cell search (beam search), and detects a first synchronization signal (PSS) to be transmitted from the base station apparatus 3 in a prescribed cycle. Upon detecting the first synchronization signal (PSS) transmitted with the first subcarrier spacing, the terminal apparatus 1 obtains information related to the identity (the physical cell ID, the beam ID, the reference signal ID, and the like). Upon obtaining the information related to the identity (the physical cell ID, the beam ID, the reference signal ID, and the like), the terminal apparatus 1 detects the second synchronization signal (SSS) transmitted with the second subcarrier spacing in a prescribed cycle from the base station apparatus 3.

The first synchronization signal (PSS) is transmitted by mapping, for example, a Zadoff-Chu sequence to the subcarrier, and the root index of the Zadoff-Chu sequence may be used to provide a subcarrier spacing (for example 30 kHz) used for the second synchronization signal (SSS) transmission and to provide the time resource/frequency resource for the search.

For example, indexes indicating subcarrier spacing candidates and/or subcarrier spacings of the second synchronization signal (SSS) such as "15", "30", "15, 30" kHz may be indicated by the root index. Also, a root index of the Zadoff-Chu sequence and a cover code (for example Hadamard sequence, M sequence, PN sequence, Gold sequence, and the like) and/or cyclic shift by which to multiply a signal generated using the Zadoff-Chu sequence and/or cyclic shift may indicate the subcarrier spacing candidates and/or subcarrier spacings of the second synchronization signal (SSS) such as "15", "30", "15, 30" kHz.

According to such a configuration, even in a case that communication is performed using subcarriers having different subcarrier spacings, the terminal apparatus 1 and the base station apparatus 3 can perform communication efficiently.

Each of a program running on a base station apparatus 3 and/or a terminal apparatus 1 according to one aspect of the present invention may be a program that controls a Central Processing Unit (CPU) and the like, such that the program causes a computer to operate in such a manner as to realize the functions of each of the above-described embodiments or modifications according to one aspect of the present invention. The information handled in these apparatuses is temporarily accumulated in a Random Access Memory (RAM) while being processed, and thereafter, the information is stored in various types of Read Only Memory (ROM) such as a flash ROM and a Hard Disk Drive (HDD), and read by the CPU to be modified or rewritten, as necessary.

Note that the terminal apparatus 1 and the base station apparatus 3 according to the above-described embodiments or modifications may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiments or modifications ma be achieved as an aggregation (a apparatus group) constituted of multiple apparatuses. Each of the apparatuses configuring such an apparatus group may include some or all portions of each function or each functional block of the base station apparatus 3 according to the above-described embodiments or modifications. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiments or modifications may serve as an Evolved Universal Terrestrial Radio Access Network (EUTRAN). Furthermore, the base station apparatus 3 according to the above-described embodiments or modifications may have some or all portions of the functions of a node higher than an eNodeB.

Furthermore, some or all portions of each of the terminal apparatus 1 and the base station apparatus 3 according to the above-described embodiments or modifications may be typically achieved as an LSI which is an integrated circuit or may be achieved as a chip set. Each of the functional blocks of the terminal apparatus 1 and the base station apparatus 3 according to the above described embodiments or modifications may be individually achieved as a chip, or some or all of the functional blocks may be integrated into a chip. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology.

Furthermore, according to the above-described embodiments or modifications, the terminal apparatus is described as one example of a communication device, but one aspect of the present invention is not limited to this, and can be applied to a fixed-type and/or a stationary-type electronic apparatus installed indoors or outdoors, for example, a terminal apparatus or a communication device, such as an audio-video (AV) apparatus, a kitchen apparatus, a cleaning or washing machine, an air-conditioning apparatus, office equipment, a vending machine, an automobile, a bicycle, and other household apparatuses.

Each of the embodiments or modifications, as one aspect of the present invention, have been described in detail above referring to the drawings, but the specific configuration is not limited to the embodiments or modifications, and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included within the technical scope of the present invention. Furthermore, a configuration in which constituent elements, described in the respective embodiments or modifications and having mutually the same effects, are substituted for one another is also included in the technical scope of the present invention.

For example, one aspect of the present invention may be realized by combining some or all of the above-described embodiments or modifications.

(Supplementary Note 1) A terminal apparatus, comprising: a first reception unit configured to receive a first synchronization signal with a first subcarrier spacing; a second reception unit configured to receive a second synchronization signal with the first subcarrier spacing; a detection unit configured to detect an identity from the first synchronization signal and/or the second synchronization signal; and a third reception unit configured to receive a first reference signal, based on the identity, with a second subcarrier spacing different from the first subcarrier spacing, wherein, the first reference signal is arranged in a time resource and a frequency resource predetermined for the second subcarrier spacing.

(Supplementary Note 2) The terminal apparatus according to Supplementary Note 1, wherein the terminal apparatus demodulate a first essential system information based on the first reference signal.

(Supplementary Note 3) The terminal apparatus according to Supplementary Note 1, further comprising a reference signal power calculation unit configured to calculate a first reference signal reception power based on the first reference signal.

(Supplementary Note 4) The terminal apparatus according to Supplementary Note 3, wherein the terminal apparatus report the first reference signal reception power to a base station apparatus.

(Supplementary Note 5) A method of communication used in a terminal apparatus, the method comprising:
receiving a first synchronization signal with a first subcarrier spacing;
receiving a second synchronization signal with the first subcarrier spacing;
detecting an identity from the first synchronization signal and/or the second synchronization signal; and
receiving a first reference signal, based on the identity, with a second subcarrier spacing different from the first subcarrier spacing, wherein,
the first reference signal is arranged in a time resource and a frequency resource predetermined for the second subcarrier spacing.

(Supplementary Note 6) The method of communication according to Supplementary Note 5, wherein a first essential system information is demodulated based on the first reference signal.

(Supplementary Note 7) The method of communication according to Supplementary Note 5, wherein a first reference signal reception power is calculated based on the first reference signal, (Supplementary Note 8) The method of communication according to Supplementary Note 7, wherein the first reference signal reception power is reported to a base station apparatus.

(Supplementary Note 9) An integrated circuit according to Supplementary Note 9, mounted in a terminal apparatus, the integrated circuit causing the terminal apparatus to perform a series of functions, the functions including:
a first reception function to receive a first synchronization signal with a first subcarrier spacing;
a second reception function to receive a second synchronization signal with the first subcarrier spacing;
a detection function to detect an identity from the first synchronization signal and/or the second synchronization signal; and
a third reception function to receive a first reference signal, based on the identity, with a second subcarrier spacing different from the first subcarrier spacing, wherein,
the first reference signal is arranged in a time resource and a frequency resource predetermined for the second subcarrier spacing.

(Supplementary Note 10) The integrated circuit according to Supplementary Note 9, wherein the integrated circuit causes a further function to demodulate a first essential system information based on the first reference signal to be performed.

(Supplementary Note 11) The integrated circuit according to Supplementary Note 9, wherein the integrated circuit causes a further function to calculate a first reference signal reception power based on the first reference signal to be performed.

(Supplementary Note 12) The integrated circuit according to Supplementary Note 11, wherein the integrated circuit causes a further function to report the first reference signal reception power to a base station apparatus to be performed.

INDUSTRIAL APPLICABILITY

One aspect of the present invention can be utilized in, for example, a communication system, a communication device (for example, a mobile phone device, a base station apparatus, a wireless LAN device, or a sensor device), an integrated circuit (for example, a communication chip), or a program and the like.

REFERENCE SIGNS LIST 1 (1A, 1B, 1C) Terminal apparatus
3 Base station apparatus
101 Processor
1011 Radio resource control unit
1013 Scheduling information interpretation unit
103 Controller
105 Receiver
1051 Decoding unit
1053 Demodulation unit
1055 Demultiplexing unit
1057 Radio Receiving unit
1059 Channel Measurement Unit
107 Transmitter
1071 Coding unit
1073 Modulation Unit
1075 Multiplexing Unit
1077 Radio transmitting unit
1079 Uplink reference signal generation unit
109 Transmit and receive antenna
110 RF unit
111 A/D conversion unit
112 PSS reception unit
113 SSS reception unit
114 Identity detection unit
115 Reference Signal receiving unit
116 RSRP calculation unit
117 MIB detection unit
301 Processor
3011 Radio resource control unit
3013 Scheduling unit
303 Controller
305 Receiver
3051 Decoding unit
3053 Demodulation unit
3055 Demultiplexing unit
3057 Radio receiving unit
3059 Channel measurement unit
307 Transmitter
3071 Coding unit
3073 Modulation unit
3075 Multiplexing unit
3077 Radio transmitting unit
3079 Downlink reference signal generation unit
309 Transmit and receive antenna

The invention claimed is:
1. A terminal device comprising:
reception circuitry configured to:
receive a first signal for first synchronization with a first subcarrier spacing,
receive a second signal for the first synchronization with the first subcarrier spacing,
receive a third signal for second synchronization with a second subcarrier spacing, the first subcarrier spacing and the second subcarrier spacing being used individually among a plurality of different subcarrier spacing candidates, and
receive a fourth signal, with a third subcarrier spacing, neither for the first synchronization nor for the second synchronization, the third subcarrier spacing being different from the second subcarrier spacing;

detection circuitry configured to detect a physical cell identity based on the first signal and the second signal; and synchronization circuitry configured to perform the first synchronization for a cell based on the first signal and the second signal and perform the second synchronization for the cell based on the third signal, wherein:
the first signal is a primary synchronization signal,
the second signal is a secondary synchronization signal,
the third signal is a Non-Zero Power-Channel State Information-Reference signal, and
the fourth signal is a Non-Zero Power-Channel State Information-Reference signal.

2. The terminal device according to claim 1, wherein, the first synchronization comprises coarse time/frequency synchronization, and the second synchronization comprises fine time/frequency synchronization.

3. A communication method used for a terminal device, the communication method comprising:
receiving a first signal for first synchronization with a first subcarrier spacing;
receiving a second signal for the first synchronization with the first subcarrier spacing;
receiving a third signal for second synchronization with a second subcarrier spacing, the first subcarrier spacing and the second subcarrier spacing being used individually among a plurality of different subcarrier spacing candidates;
receiving a fourth signal, with a third subcarrier spacing, neither for the first synchronization nor for the second synchronization, the third subcarrier spacing being different from the second subcarrier spacing;
detecting a physical cell identity based on the first signal and the second signal; and
performing the first synchronization for a cell based on the first signal and the second signal and performing the second synchronization for the cell based on the third signal, wherein:
the first signal is a primary synchronization signal,
the second signal is a secondary synchronization signal,
the third signal is a Non-Zero Power-Channel State Information-Reference signal, and
the fourth signal is a Non-Zero Power-Channel State Information-Reference signal.

4. A base station device comprising:
transmission circuitry configured to:
transmit a first signal for first synchronization with a first subcarrier spacing, and transmit a second signal for the first synchronization with the first subcarrier spacing, to cause a terminal apparatus to perform the first synchronization for a cell based on the first signal and the second signal,
transmit a third signal for second synchronization with a second subcarrier spacing to cause the terminal apparatus to perform the second synchronization for the cell based on the third signal, the first subcarrier spacing and the second subcarrier spacing being used individually among a plurality of different subcarrier spacing candidates, and
transmit a fourth signal, with a third subcarrier spacing, neither for the first synchronization nor for the second synchronization, the third subcarrier spacing being different from the second subcarrier spacing; and
determination circuitry configured to determine a physical cell identity based on the first signal and the second signal, wherein:
the first signal is a primary synchronization signal,
the second signal is a secondary synchronization signal,
the third signal is a Non-Zero Power-Channel State Information-Reference signal, and
the fourth signal is a Non-Zero Power-Channel State Information-Reference signal.

5. The base station device according to claim 4, wherein, the first synchronization comprises coarse time/frequency synchronization, and the second synchronization comprises fine time/frequency synchronization.

* * * * *